(12) United States Patent
Chen et al.

(10) Patent No.: US 10,595,167 B2
(45) Date of Patent: Mar. 17, 2020

(54) METHOD AND APPARATUS OF HANDLING INTEREST INDICATION IN A WIRELESS COMMUNICATION SYSTEM

(71) Applicant: ASUSTeK COMPUTER INC., Taipei (TW)

(72) Inventors: Wei-Yu Chen, Taipei (TW); Yu-Hsuan Guo, Taipei (TW); Li-te Pan, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/869,596

(22) Filed: Jan. 12, 2018

(65) Prior Publication Data
US 2018/0206080 A1 Jul. 19, 2018

Related U.S. Application Data

(60) Provisional application No. 62/445,476, filed on Jan. 12, 2017.

(51) Int. Cl.
*H04W 4/06* (2009.01)
*H04W 4/50* (2018.01)
(Continued)

(52) U.S. Cl.
CPC ............. *H04W 4/06* (2013.01); *H04W 4/50* (2018.02); *H04W 60/04* (2013.01);
(Continued)

(58) Field of Classification Search
CPC ..... H04W 4/06; H04W 4/08; H04W 4/20–23; H04W 4/50; H04W 60/005–06;
(Continued)

(56) References Cited

U.S. PATENT DOCUMENTS

2014/0328329 A1 11/2014 Novlan
2015/0049600 A1 2/2015 Balasubramanian
(Continued)

OTHER PUBLICATIONS

3rd Generation Partnership Project; Technical Speciticaton Group Radio Access Network; Evolved Universal Terrestrial Radio Access (E-UTRA); Radio Resource Control (RRC); Protocol specification (Release 14), 3GPP Draft; 36331-E10, 3rd Generation Partnership Project (3GPP), Mobile Competence Centre ; 650, Route Des Lucioles ; F-06921 Sophia-Antipolis Cedex ;France Dec. 28, 2016 (Dec. 28, 2016), XP051203538, Retrieved from the Internet: URL: http://www.3gpp.org/ftp/tsg_ran/WG2_RL2/Specifications/201612_final_specs_after_RAN_74/ [retrieved on Dec. 28, 2016], Abstract, Section 5.8-5.10, 727 Pages.
(Continued)

*Primary Examiner* — Timothy J Weidner
(74) *Attorney, Agent, or Firm* — Cooper Legal Group, LLC

(57) ABSTRACT

Method and apparatus for a user equipment (UE) operating in a serving cell is disclosed. The UE, in a first RRC_CONNECTED state, transmits an interest indication for a broadcast or a multicast service to a first serving cell. The interest indication includes at least some information associated with a broadcast or a multicast service. Upon entering a second RRC_CONNECTED state from an RRC_INACTIVE state, the UE may or may not send an interest indication to a second serving cell, taking into account the differences between the first and second serving cell, whether the second serving cell requested transmission of an interest indication, or whether the content of the second interest indication would be the same as the content of the first interest indication. A network node may retain UE context and other UE-related information after the UE has left an RRC_CONNECTED state, forward the information to another network node, and/or process the information when the UE re-enters the RRC_CONNECTED state.

19 Claims, 20 Drawing Sheets

(51) Int. Cl.
*H04W 60/04* (2009.01)
*H04W 72/00* (2009.01)
*H04W 76/27* (2018.01)
*H04W 76/40* (2018.01)
*H04W 88/06* (2009.01)

(52) U.S. Cl.
CPC ......... *H04W 72/005* (2013.01); *H04W 76/27* (2018.02); *H04W 76/40* (2018.02); *H04W 88/06* (2013.01)

(58) Field of Classification Search
CPC ... H04W 72/005; H04W 76/20; H04W 76/25; H04W 76/27; H04W 76/40; H04W 88/06; H04W 88/10
See application file for complete search history.

(56) References Cited

U.S. PATENT DOCUMENTS

2016/0381517 A1* 12/2016 Kim ................ H04W 76/10 370/331
2017/0245233 A1   8/2017 Jung
2018/0084524 A1*  3/2018 Pradas ............. H04W 68/02 455/458

OTHER PUBLICATIONS

European Search Report for European Patent Application No. EP 18151342 dated Feb. 21, 2018, 9 Pages.

\* cited by examiner

| Interest Indication Type | Transmission Allowed If Same Content As Type 1 | RRC Transition Trigger | Requires Request From Serving Cell 2 | Must Serving Cell 2 Be Different Location From Serving Cell 1 |
|---|---|---|---|---|
| Type 1 | N/A | N/A | N/A | N/A |
| Type 2 | No | RRC_INACTIVE → RRC_CONNECTED | No | No |
| Type 3 | Yes | RRC_IDLE → RRC_CONNECTED | No | No |
| Type 4 | Yes | RRC_INACTIVE → RRC_CONNECTED | Yes | No |
| Type 5 | Yes | RRC_INACTIVE → RRC_CONNECTED | No | Yes |

FIG. 6

METHOD AND APPARATUS OF HANDLING INTEREST INDICATION IN A WIRELESS COMMUNICATION SYSTEM

CROSS-REFERENCE TO RELATED APPLICATIONS

This application claims the benefit of U.S. Provisional Application Ser. No. 62/445,476, filed Jan. 12, 2017, and entitled "Method and Apparatus of Handling Interest Indication in a Wireless Communication System," the entirety of which is expressly incorporated herein by reference.

TECHNICAL FIELD

The subject disclosure relates generally to communications systems, and specifically to broadcast and multicast services provided by wireless communications systems.

BACKGROUND

The 3rd Generation Partnership Project (3GPP), which provides reference designs and identifies issues that require consideration and solutions for 5G, has identified many unresolved issues related to resource allocation, resource control and transmitting control channel information for 5G systems. Inventions presented in the subject disclosure provide numerous solutions to those issues, including, for example, efficiently generating and managing interest indications for broadcast and multicast services.

BRIEF DESCRIPTION OF THE DRAWINGS

Various non-limiting embodiments are further described with reference to the accompanying drawings in which:

FIG. 6 illustrates an example, non-limiting table enumerating types of interest indications transmitted by a UE, within the scope of this disclosure;

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without limitation to any particular network environment or standard).

Figure 1:
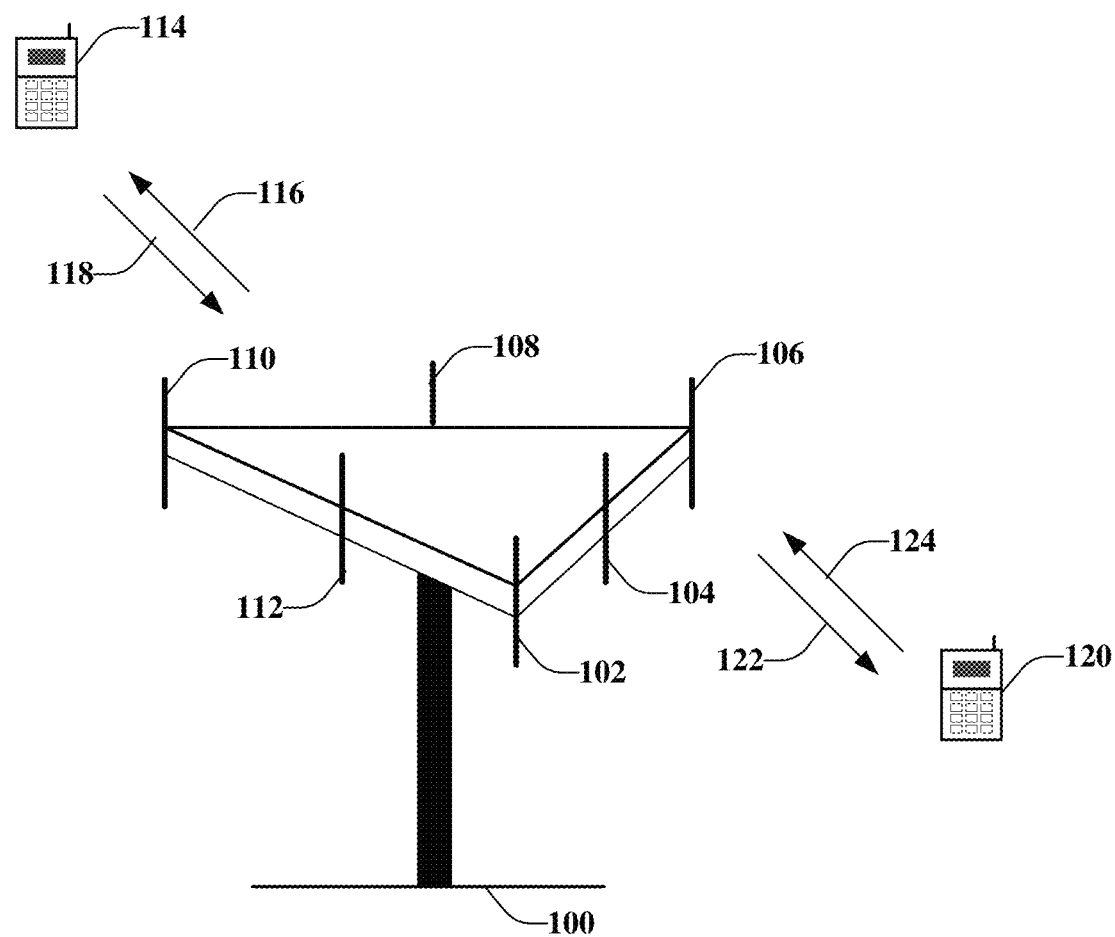
FIG. 1 illustrates an example, non-limiting wireless communication system, in accordance with one or more embodiments described herein.

Referring initially to FIG. 1, illustrated is an example, non-limiting wireless communications system, for transmission of services, e.g., Multimedia Broadcast Multicast Service (MBMS), in accordance with one or more embodiments described herein. The wireless communications system includes one or mobile devices (or UEs) 114 and 120, and a network node 100. UEs 114 and 120 can be in communication with network node 100 (e.g., eNodeB, eNB, gNodeB, gNB, network, cell, or other terminology). Antennas 102, 104, 106, 108, 110, and 112 transmit and receive communications between network node 100 and mobile devices, including UEs 114 and 120. It is noted that although various aspects are discussed with respect to two mobile devices and a single network node, the various aspects discussed herein can be applied to one or more mobile devices and/or one or more network nodes, and can be applied to different communications technologies, including Long Term Evolution (LTE, also referred to as 4G) standard, as specified in Third Generation Partnership Project (3GPP) Release 8 (December 2008) and subsequent releases, and 5G. Further, UEs 114 and 120 and/or the network node 100 can be in communication with other user equipment or mobile devices (not shown) and/or other network nodes (not shown). A "link" is a communications channel that connects two or more devices or nodes. Uplinks (UL) 118 and 120 refer to links used for the transmission of signals from UEs 114 and 120, respectively, to the network node 100. Downlinks (DL) 116 and 122 refer to links used for the transmission of signals from network node 100 to UEs 114 and 120, respectively.

In its development of 5G, the followup to LTE, the 3GPP has identified the delivery of broadcast or multicast services, e.g., MBMS, enhanced MBMS (eMBMS), as an area for improvement. The identified use cases and requirements are set forth in 3GPP TR 22.891 v.14.2.0 (September 2016), "3rd Generation Partnership Project; Technical Specification Group Services and System Aspects; Feasibility Study on New Services and Markets Technology Enablers; Stage 1 (Release 14)," which is incorporated by reference herein in its entirety, and quoted in part below:

"5.56 Broadcasting Support
5.56.1 Description
The system shall be able to support an enhanced form of MBMS that includes transmission of scheduled linear time Audio and Audio &Video programmes.

Pre-Conditions
Both Mobile and Network support an enhanced and flexible form of MBMS. The Network has previously allocated MBMS resources.
Service Flows
1. A 3GPP device accesses an advertised MBMS service for broadcast information via a broadcast management system.
2. The mobile downloads the 3GPP resource group nomination (e.g. a channel code) for the cell that they are camped on for this broadcast channel from the broadcast management system.
3. The User keys in the channel code and starts receiving the broadcast channel subject to any authorisation.
Post-Conditions
Void.
5.57 Ad-Hoc Broadcasting
5.57.1 Description
MBMS and eMBMS have been defined in UMTS and LTE. However take-up has been poor. There are established terrestrial and satellite digital broadcast capabilities as well as evolving IP-TV content delivery systems whether linear or replay based. There is also a thriving video blog market via IP.
However, there is a demand for good quality event based content broadcasting over and above IP web pages and video snippets.
This use case proposes the ability to setup event based video content broadcasting, using a slice of the local or temporary 3GPP system in the environ of the event.
The event in this context may not be limited to purely sporting or entertainment, but may be a truly ad-hoc video broadcast that interested parties want to see based on a social web advert.
The envisaged difference for this use case for future 3GPP systems as compared to today is that the video content in this case, may be live and may not ever be stored on a video server in the network but may be only transmitted as a 'one-off' by either a broadcast organisation or an individual.
It is envisaged that in order to support this capability, a future mobile unit is operated to provide the video source content and then a DEDICATED resource budget is allocated in a given area or area(s) to enable multicast broadcast to other mobiles when their users elect to receive the content via a 3GPP Ad-Hoc MBMS service.
The benefits are that this is a dynamic way to efficiently broadcast video content on an ad-hoc basis as opposed to a user uploading and then each user separately downloading from a server or group communications point.
Pre-Conditions
The source broadcasting mobile has an internet connection over the 3GPP system and video camera/codec capabilities on their phone.
The recipient broadcast received mobiles have the ability to connect to an Ad-Hoc MBMS group.
Service Flows
1. A fixed or mobile 3GPP device user (individual and/or organisation) makes a request that they want to broadcast a video via an Ad-Hoc-MBMS social/operator provided broadcast request management system. The requester specifies the title, description, duration, format and 'scope' of the broadcast. Scope is specified in terms of locale and radius of desired broadcast coverage and mapped at the service centre to a single cell or number of cells that support the requested locale/range.
2. Alternatively the broadcast requester may be another type of device that is fixed connected to the internet and has access to the broadcast request management system.
3. The Ad-Hoc-MBMS application is operated by a host machine or sub-system which has a new interface towards the 3GPP system to make a request for ad-hoc resources for broadcasting the content. (N.B: this service could be chargeable).
4. The operator network element responsible for ad-hoc broadcast requests responds to the broadcaster request and if possible allocates local resources scheduled at a future time to broadcast the content as a 'broadcast opportunity window'.
5. The broadcast requester accepts the opportunity and the operator network element schedules MBMS resources for a given area scope specified in the original request.
6. The broadcast event is added to the ad-hoc broadcast channel programme guide (e.g. on a web page) that is part of the Ad-hoc MBMS service manager. Each broadcast event is given a code for the broadcast receiving devices to select to identify the MBMS resources to 'tune in to' to listen to the ad-hoc broadcast.
7. If the broadcast is for a single cell ad-hoc broadcast then, at the broadcast opportunity start time, the mobile broadcast requester broadcasts the ad-hoc broadcast content to the users in the locale directly, on the resources scheduled by the network earlier.
8. For multiple cell ad-hoc broadcasts, the cell that the broadcast requester is camped-on, also receives the broadcast and relays the stream to other adjacent cells listed in the scope request over the core network for rebroadcast on the resources identified at each adjacent cell in the list.

Post-Conditions

Resources operated to support the Ad-Hoc MBMS broadcast are released back into the pool for each cell where the ad-hoc broadcast was staged.

5.70 Broadcast/Multicast Services Using a Dedicated Radio Carrier 5.70.1 Description The massive growth in mobile broadband services over the last few years has caused regulatory bodies across the world to consider re-allocating some of the UHF spectrum, because of its superior propagation characteristics, for mobile broadband services. This could potentially cause displacement of smaller/rural TV broadcasters and make them look at alternate delivery models (e.g. channel sharing, delivery via mobile broadband, etc.). The NGMN whitepaper [2] has considered that 5G systems could substitute or complement radio/television broadcast services.

As a potential new business opportunity, wireless operators could deploy an overlay 3GPP network using dedicated spectrum for the broadcast service to serve the customers affected by displacement of smaller broadcasters within a geographic area.

Alternatively, a new wireless entrant could deliver a stand-alone broadcast/multicast only service over a large geographic area by deploying less number of sites with greater coverage area.

Consider a use case where Operator A has deployed a 3GPP system using frequency f1 in urban geographic area where demand for the mobile broadband service, and therefore the capacity need is the highest. Operator A decides to introduce a new broadcast/multicast service either on its own or in partnership with another broadcast/multicast service provider. The service is expected to be made available over a much wider area than its existing 3GPP system.

Wireless operator A deploys an overlay over its existing 3GPP system to create a single frequency network with few sites, each covering a wide geographic area. In order to ensure it can accommodate a wide variety of broadcast/multicast content simultaneously, wireless operator A uses a dedicated frequency, f2, to deploy the broadcast/multicast service.

As a result of this overlay deployment users in urban area X can simultaneously receive existing broadband data services (on f1) as well as the new broadcast/multicast service (on f2). Users in suburban/rural areas Y and Z only receive the new broadcast/multicast service."

With respect to network operations, 3GPP TR 22.864 v.15.0.0 (September 2016), "3rd Generation Partnership Project; Technical Specification Group Services and System Aspects; Feasibility Study on New Services and Markets Technology Enablers—Network Operation; Stage 1 (Release 15)," which is incorporated by reference herein in its entirety, identifies use cases for 5G network operators. Section 5.1 provides exemplars of system flexibility desired for 5G, and is quoted in part below:

"5 Use Case Families 5.1 System Flexibility

Flexibility Enabler 4: Flexible Broadcast Service

A flexible broadcast service (e.g., an enhanced form of MBMS), allows the users to receive linear time audio as well as audio and video programmes such as 4 k UHD. The user is able to select the expected broadcast program from the broadcaster's management system. Another new possible broadcast service is a truly ad-hoc video broadcast that interested parties want to see based on a social web advert, and the video content may be live and may not ever be stored on a video server in the network but may be only transmitted as a 'one-off' by either a broadcast organisation or an individual.

Today, 3GPP specifications do not allow a stand-alone deployment of a multicast/broadcast network. Additionally, the current implementation limits the radio resources that can be allocated for multicast/broadcast service to 60%. It also limits the coverage size of the radio base station to a relatively small value. In order to support a variety of linear video based services for the users, deployment of the next generation of multicast/broadcast capabilities will require significantly more flexibility than what is available in the current network in terms of configuration, resource allocation and network deployment to support broadcast/multicast services. The flexibility required encompasses allocation of resources, multicast/broadcast network design as well as simultaneous user access to unicast data and broadcast service."

In addition to 3GPP, the NGMN Alliance has examined possible use cases for 5G in the NGMN 5G White Paper v.1.0 (February 2015), which is incorporated by reference herein in its entirety. Section 3.2.1 articulates use cases for consideration in developing requirements for 5G architecture, and is quoted in part below:

"Broadcast-Like Services

While personalization of communication will lead to a reducing demand for legacy broadcast as deployed today, e.g. linear TV, the fully mobile and connected society will nonetheless need efficient distribution of information from one source to many destinations. These services may distribute content as done today (typically only downlink), but also provide a feedback channel (uplink) for interactive services or acknowledgement information. Both, real-time or non-real time services should be possible. Furthermore, such services are well suited to accommodate vertical industries' needs. These services are characterized by having a wide distribution which can be either geo-location focused or address-space focused (many end-users).

xviii. News and Information

Beyond 2020, receiving text/pictures, audio and video, everywhere and as soon as things happen (e.g., action or score in a football match) will be common. Customers in specific areas should simultaneously receive appropriate news and information regardless of the device they are using and their network connection.

xix. Local Broadcast-Like Services

Local services will be active at a cell (compound) level with a reach of for example 1 to 20 km. Typical scenarios include stadium services, advertisements, voucher delivery, festivals, fairs, and congress/convention. Local emergency services can exploit such capabilities to search for missing people or in the prevention or response to crime (e.g. theft).

xx. Regional Broadcast-Like Services

Broadcast-like services with a regional reach will be required, for example within 1 to 100 km. A typical scenario includes communication of traffic jam information. Regional emergency warnings can include disaster warnings. Unlike the legacy broadcast service, the feedback channel can be used to track delivery of the warning message to all or selected parties.

xxi. National Broadcast-Like Services

National or even continental/world-reach services are interesting as a substitute or complementary to broadcast services for radio or television. Also vertical industries will benefit from national broadcast like services to upgrade/distribution of firmware. The automotive industry may leverage the acknowledgement broadcast capability to mitigate the need for recall campaigns. This requires software patches to be delivered in large scale, and successful updates to be confirmed and documented via the feedback channel. The post-2020 outlook, shown throughout the use cases above, is extremely broad in terms of variety of applications and variability of their performance attributes. The use case families shown earlier represent both enriched service categories and also prospects for numerous new services. Note that some may have overlaps."

In considering radio access technologies for 5G, a new Radio Resource Control (RRC) state, RRC_INACTIVE, has been proposed. In 3GPP TR 38.804 v.0.4.0 (November 2016), "3rd Generation Partnership Project; Technical Specification Group Radio Access Network; Study on New Radio Access Technology; Radio Interface Protocol Aspects (Release 14),", which is incorporated by reference herein in its entirety, and quoted in part below:

"5.2 Radio Interface Protocol Architecture

For NR, a technology of aggregating NR carriers is studied. Both lower layer aggregation like Carrier Aggregation (CA) for LTE (see [3]) and upper layer aggregation like DC are investigated. From layer 2/3 point of view, aggregation of carriers with different numerologies is supported in NR. Modelling aspects such as whether it is a single or multiple MAC entity is FFS.

5.5.3 System Information Handling

Figure 5:
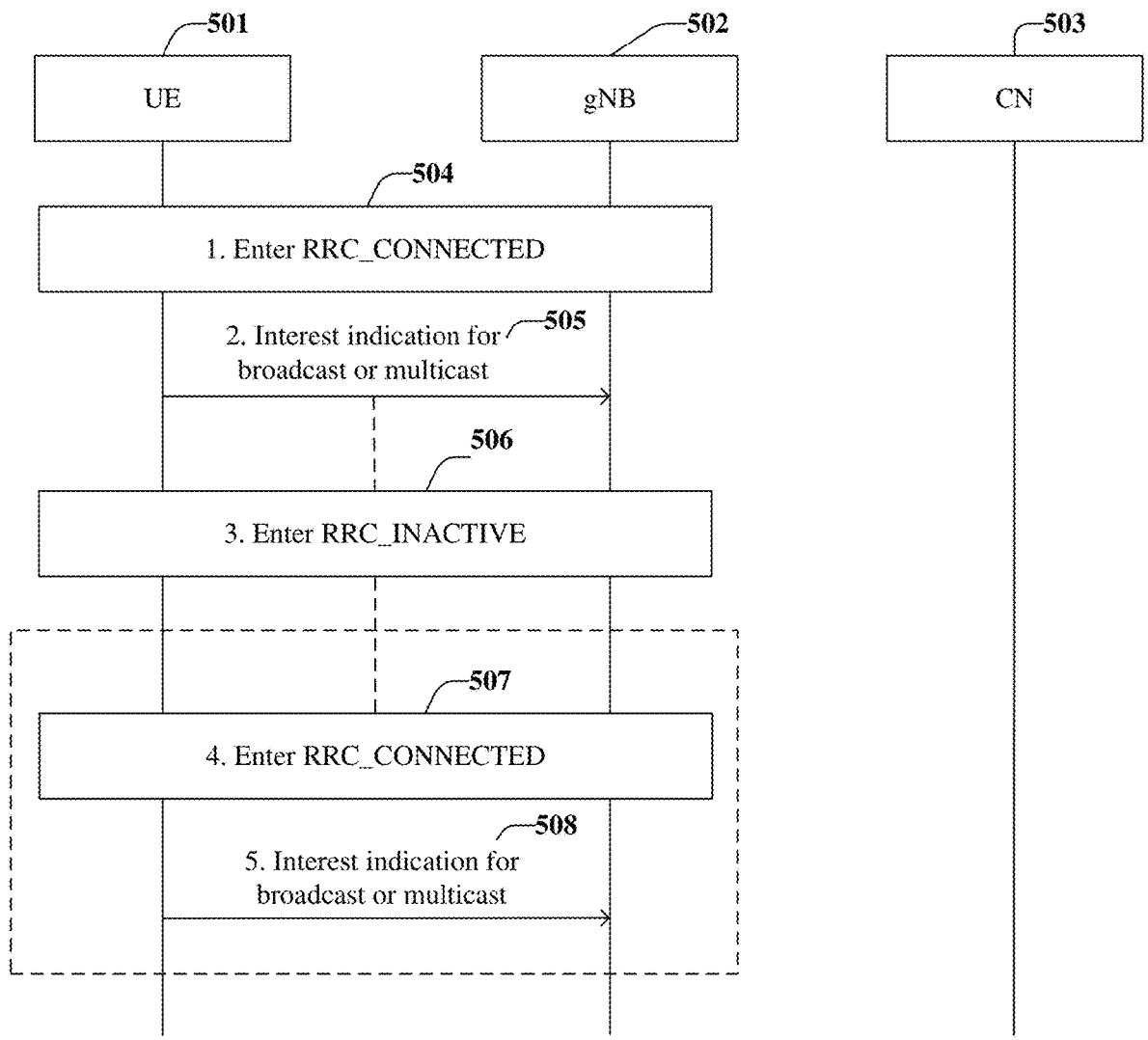
FIG. 5 illustrates an example, non-limiting flow diagram, in which a UE transmits an interest indication upon re-entering an RRC_CONNECTED state, resulting in increased signaling overhead.

System information is divided into minimum SI and other SI. Minimum SI is periodically broadcast. The minimum SI comprises basic information required for initial access to a cell and information for acquiring any other SI broadcast periodically or provisioned via on-demand basis. The other SI encompasses everything not broadcast in the minimum SI. The other SI may either be broadcast, or provisioned in a dedicated manner, either triggered by the network or upon request from the UE as illustrated in FIG. 5.5.3.1.2-1. For the other SI required by the UE, before the UE sends the other SI request the UE needs to know whether it is available in the cell and whether it is broadcast or not (e.g. by checking the minimum SI). The UE in RRC_IDLE or RRC_INACTIVE should be able to request the other SI without requiring a state transition. The other SI may be broadcast at configurable periodicity and for certain duration. PWS information can be classified into the other SI.

A.2 User Plane Aspects

The eNB should have means to control which logical channels the UE may map to which numerology and/or TTIs with variable duration. Details FFS (e.g. whether semi-static or dynamic, hard split/soft split, etc).

A UE can support multiple numerologies from a single cell. FFS whether this is modelled as 1 or multiple MAC entities.

A.4 RRC

With regards to RRC states related considerations (to be captured in sub-clause 5.5.2):

Study the introduction of a RAN controlled "state" characterised by, at least:
a) UEs in RAN controlled state should incur minimum signalling, minimise power consumption, minimise resource costs in the RAN/CN making it possible to maximise the number of UEs utilising (and benefiting from) this state.
b) Able to start data transfer with low delay (as required by RAN requirements).

FFS whether data transfer is by leaving the "state" or data transfer can occur within the "state".

FFS whether "state" translates to an RRC state.

Potential characteristics of the RAN controlled "state" for study:
a) The CN/RAN connection is maintained.
b) AS context stored in RAN.
c) Network knows the UE's location within an area and UE performs mobility within that area without notifying the network.
d) RAN can trigger paging of UEs which are in the RAN controlled "inactive state".
e) No dedicated resources.

RRC states with significantly overlapping characteristics should be avoided.

At least one RRC state for low activity should meet the NR control plane latency requirement and must be capable of achieving comparable power efficiency to that of LTE's IDLE state.

One UE has only one NR RRC state at one time.

The connection (both CP and UP) between RAN and Core should be maintained in the "new state".
FFS whether the "new state" can be transparent to Core.

For the UE in the "new state", a RAN initiated notification procedure should be used to reach UE. And the notification related parameters should be configured by RAN itself.

FFS how the notification will be transmitted (e.g. via a beam, broadcast, etc.).

For the UE in the "new state", RAN should be aware whenever the UE moves from one "RAN-based notification area" to another.

FFS how CN location updates and RAN updates interact, if needed.

Agree that, in the 'new state' there will be a mechanism where the UE first transits to the full connected state where data transmission can occur.

RAN2 will study the possibility for the UE to perform data transmission without state transition from the 'new state' to be fully connected.

With regards to system information provisioning (to be captured in sub-clause 5.5.3):

Other mechanisms than periodic broadcast of system information should be studied during study item.

Agree on the terminology of Minimum SI (at least for purpose of the SI discussions).

Minimum SI needs to be broadcasted periodically.

Contents and format of minimum SI are FFS. Content will at least include information to support cell selection, for acquiring other SI, for accessing the cell.

FFS Whether all "cells"/TRPs periodically broadcast the minimum SI.

Agree on the terminology of Other SI where other SI comprises everything not broadcasted in minimum SI.

FFS Whether ETWS/CMAS like information would be considered as Other SI or Minimum SI.

Both network triggered and UE initiated mechanisms for Other SI delivery shall be further studied.

It is network decision whether other SI is broadcasted or delivered through UE-specific signaling."

In 5G, the new radio access technology (RAT), also known as New Radio (NR), includes requirements for supporting multimedia broadcast or multicast services, and possible requirements and scenarios are set out in 3GPP TR 38.913 v.14.0.0 (October 2016), "3rd Generation Partnership Project; Technical Specification Group Radio Access Network; Study on Scenarios and Requirements for Next Generation Access Technologies; (Release 14)," which is incorporated herein in its entirety. Section 9, which is quoted in part below, sets forth requirements relating to supplementary services:

"9.1 Multimedia Broadcast/Multicast Service

The new RAT shall support existing Multicast/Broadcast services (e.g. download, streaming, group communication, TV, etc.) and new services (e.g. V2X, etc).

The new RAT shall support dynamic adjustment of the Multicast/Broadcast area based on e.g. the user distribution or service requirements.

The new RAT shall support concurrent delivery of both unicast and Multicast/Broadcast services to the users.

The new RAT shall support efficient multiplexing with unicast transmissions in at least frequency domain and time domain.

The new RAT shall support static and dynamic resource allocation between Multicast/Broadcast and unicast; the new RAT shall in particular allow support of up to 100% of DL resources for Multicast/Broadcast (100% meaning a dedicated MBMS carrier).

The new RAT shall support Multicast/Broadcast network sharing between multiple participating MNOs, including the case of a dedicated MBMS network.

The new RAT shall make it possible to cover large geographical areas up to the size of an entire country in SFN mode with network synchronization and shall allow cell radii of up to 100 km if required to facilitate that objective. It shall also support local, regional and national broadcast areas.

The new RAT shall support Multicast/Broadcast services for fixed, portable and mobile UEs. Mobility up to 250 km/h shall be supported.

The new RAT shall leverage usage of RAN equipment (hard- and software) including e.g. multi-antenna capabilities (e.g. MIMO) to improve Multicast/Broadcast capacity and reliability.

The new RAT shall support Multicast/Broadcast services for mMTC devices."

While MBMS and eMBMS are defined in the technical specifications for LTE and its predecessor UMTS, adoption has been poor. A possible area of improvement in 5G NR, as well as in LTE, is in the transmission of interest indications for broadcast or multicast service to the eNB (LTE) or gNB (5G). In LTE, handling of MBMS interest indications is disclosed in 3GPP TS 36.331 v.14.0.0 (October 2016), "3rd Generation Partnership Project; Technical Specification Group Radio Access Network; Evolved Universal Terrestrial Radio Access (E-UTRA); Radio Resource Control (RRC); Protocol specification (Release 14)", which is incorporated by reference here in its entirety. It will be appreciated that, where features in LTE or UMTS are cited, e.g., MBMSInterestIndication, analogous or equivalent functionality (whether or not using the same nomenclature or terminology) may be applicable in NR within the scope of this disclosure. In LTE, broadcast or multicast technologies are discussed in at least the following, which are incorporated by reference herein in their entirety: 3GPP TS 22.146 v.13.0.0 (December 2015), "3rd Generation Partnership Project; Technical Specification Group Services and System Aspects; Multimedia Broadcast/Multicast Service (MBMS); Stage 1 (Release 13)"; 3GPP TS 22.246 v.13.0.0 (December 2015), "3rd Generation Partnership Project; Technical Specification Group Services and System Aspects; Multimedia Broadcast/Multicast (MBMS) user services; Stage 1 (Release 13)"; 3GPP TS 23.246 v.14.1.0 (December 2016), "3rd Generation Partnership Project; Technical Specification Group Services and System Aspects; Multimedia Broadcast/Multicast Service (MBMS); Architecture and functional description (Release 14)"; 3GPP TS 26.346 v.14.1.0 (December 2016), "3rd Generation Partnership Project; Technical Specification Group Services and System Aspects; Multimedia Broadcast/Multicast Service (MBMS); Protocols and codecs (Release 14)"; and 3GPP TR 36.890 v.13.0.0 (June 2015), "3rd Generation Partnership Project; Technical Specification Group Radio Access Network; Evolved Universal Terrestrial Radio Access (E-UTRA); Study on single-cell point-to-multipoint transmission for E-UTRA (Release 13)".

Section 6.3.1 of 3GPP TS 36.331 v.14.0.0, which is quoted in part below, defines certain system information blocks for handling RRC information:

SystemInformationBlockType2

The IE SystemInformationBlockType2 contains radio resource configuration information that is common for all UEs.

NOTE: UE timers and constants related to functionality for which parameters are provided in another SIB are included in the corresponding SIB.

SystemInformationBlockType2 Information Element

```
-- ASN1START
SystemInformationBlockType2 ::=    SEQUENCE {
    ...
    mbsfn-SubframeConfigList           MBSFN-SubframeConfigList
    OPTIONAL, -- Need OR
    ...

MBSFN-SubframeConfigList ::=    SEQUENCE (SIZE (1..maxMBSFN-Allocations))
OF MBSFN-SubframeConfig
```

SystemInformationBlockType2 field descriptions mbsfn-SubframeConfigList
Defines the subframes that are reserved for MBSFN in downlink.
NOTE 1.

SystemInformationBlockType13

The IE SystemInformationBlockType13 contains the information required to acquire the MBMS control information associated with one or more MBSFN areas.

SystemInformationBlockType13 Information Element

```
-- ASN1START
SystemInformationBlockType13-r9 ::=    SEQUENCE {
    mbsfn-AreaInfoList-r9              MBSFN-AreaInfoList-r9,
    notificationConfig-r9              MBMS-NotificationConfig-r9,
    lateNonCriticalExtension           OCTET STRING
    OPTIONAL,
    ...
}
-- ASN1STOP
```

SystemInformationBlockType13 field descriptions notificationConfig
Indicates the MBMS notification related configuration parameters.
The UE shall ignore this field when dl-Bandwidth included in
MasterInformationBlock is set to n6.

SystemInformationBlockType15

The IE SystemInformationBlockType15 contains the MBMS Service Area Identities (SAI) of the current and/or neighbouring carrier frequencies.

SystemInformationBlockType15 Information Element

```
-- ASN1START
SystemInformationBlockType15-r11 ::=    SEQUENCE {
    mbms-SAI-IntraFreq-r11                MBMS-SAI-List-r11
        OPTIONAL, -- Need OR
    mbms-SAI-InterFreqList-r11            MBMS-SAI-InterFreqList-r11
        OPTIONAL, -- Need OR
    lateNonCriticalExtension              OCTET STRING
        OPTIONAL,
    ...,
    [[ mbms-SAI-InterFreqList-v1140      MBMS-SAI-InterFreqList-v1140
        OPTIONAL -- Cond InterFreq
    ]]
}
MBMS-SAI-List-r11 ::=                    SEQUENCE (SIZE (1..maxSAI-
MBMS-r11)) OF MBMS-SAI-r11
MBMS-SAI-r11 ::=                         INTEGER (0..65535)
MBMS-SAI-InterFreqList-r11 ::=           SEQUENCE (SIZE (1..maxFreq)) OF
MBMS-SAI-InterFreq-r11
MBMS-SAI-InterFreqList-v1140 ::=         SEQUENCE (SIZE (1..maxFreq)) OF MBMS-SAI-
InterFreq-v1140
```

-continued

```
MBMS-SAI-InterFreq-r11 ::=           SEQUENCE {
    dl-CarrierFreq-r11                   ARFCN-ValueEUTRA-r9,
    mbms-SAI-List-r11                    MBMS-SAI-List-r11
}
MBMS-SAI-InterFreq-v1140 ::=         SEQUENCE {
    multiBandInfoList-r11                MultiBandInfoList-r11
        OPTIONAL -- Need OR
}
-- ASN1STOP
```

| SystemInformationBlockType15 field descriptions |
|---|
| mbms-SAI-InterFreqList<br>Contains a list of neighboring frequencies including additional bands, if any, that provide MBMS services and the corresponding MBMS SAIs.<br>mbms-SAI-IntraFreq<br>Contains the list of MBMS SAIs for the current frequency. A duplicate MBMS SAI indicates that this and all following SAIs are not offered by this cell but only by neighbour cells on the current frequency. For MBMS service continuity, the UE shall use all MBMS SAIs listed in mbms-SAI-IntraFreq to derive the MBMS frequencies of interest.<br>mbms-SAI-List<br>Contains a list of MBMS SAIs for a specific frequency.<br>multiBandInfoList<br>A list of additional frequency bands applicable for the cells participating in the MBSFN transmission. |

| Conditional presence | Explanation |
|---|---|
| InterFreq | The field is optionally present, need OR, if the mbms-SAI-InterFreqList-r11 is present. Otherwise it is not present. |

SystemInformationBlockType20

The IE SystemInformationBlockType20 contains the information required to acquire the control information associated transmission of MBMS using SC-PTM.

SystemInformationBlockType20 Information Element

```
-- ASN1START
SystemInformationBlockType20-r13 ::=  SEQUENCE {
    sc-mcch-RepetionPeriod-r13        ENUMERATED {rf2, rf4, rf8, rf16, rf32, rf64,
rf128, rf256},
    sc-mcch-Offset-r13                INTEGER (0..10),
    sc-mcch-FirstSubframe-r13         INTEGER (0..9),
    sc-mcch-duration-r13              INTEGER (2..9)   OPTIONAL,
    sc-mcch-ModificationPeriod-r13    ENUMERATED {rf2, rf4, rf8, rf16, rf32, rf64,
rf128, rf256,
                                                   rf512, rf1024, r2048,
rf4096, rf8192, rf16384, rf32768,
        rf65536},
    lateNonCriticalExtension          OCTET STRING
        OPTIONAL,
    ...
}
-- ASN1STOP
```

| SystemInformationBlockType20 field descriptions |
|---|
| sc-mcch-ModificationPeriod<br>Defines periodically appearing boundaries, i.e. radio frames for which SFN mod sc-mcch-ModificationPeriod = 0. The contents of different transmissions of SC-MCCH information can only be different if there is at least one such boundary in-between them. Value rf2 corresponds to 2 radio frames, value rf4 corresponds to 4 radio frames and so on.<br>sc-mcch-duration<br>Indicates, starting from the subframe indicated by sc-mcch-FirstSubframe, the duration in subframes during which SC-MCCH may be scheduled in PDCCH sub-frames, see TS 36.321 [6]. Absence of this IE means that SC-MCCH is only scheduled in the subframe indicated by sc-mcch-FirstSubframe.<br>sc-mcch-Offset<br>Indicates, together with the sc-mcch-RepetitionPeriod, the radio frames in which SC-MCCH is scheduled i.e. SC-MCCH is scheduled in radio frames<br>for which: SFN mod sc-mcch-RepetitionPeriod = sc-mcch-Offset.<br>sc-mcch-FirstSubframe<br>Indicates the first subframe in which SC-MCCH is scheduled<br>sc-mcch-RepetitionPeriod<br>Defines the interval between transmissions of SC-MCCH information, in radio frames. Value rf2 corresponds to 2 radio frames, rf4 corresponds to 4 radio frames and so on." |

Section 5.8 of 3GPP TS 36.331 v.14.0.0, discusses MBMS, including handling of MBMS interest indications, and is quoted in part below:

"5.8.5 MBMS Interest Indication
5.8.5.1 General

Figure 18:
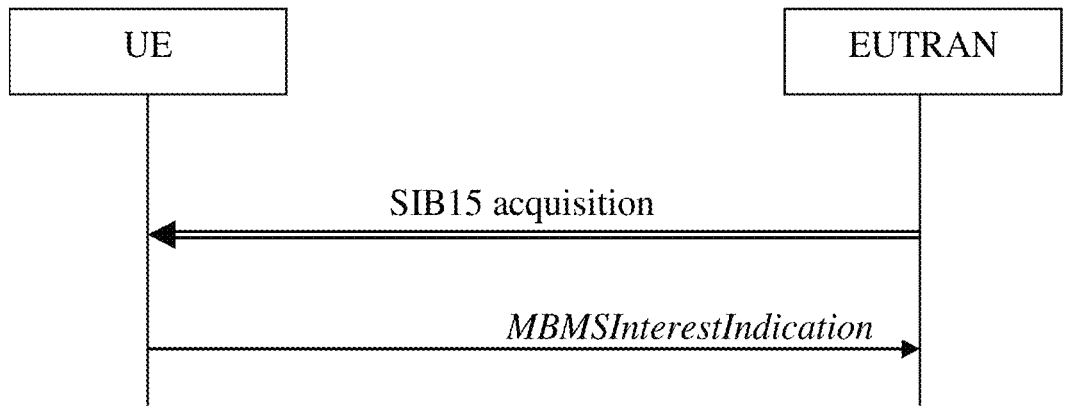
FIG. 18 is a reproduction of FIG. 5.8.5.1-1 from 3GPP TS 36.331 v.14.0.0 (October 2016), "3rd Generation Partnership Project; Technical Specification Group Radio Access Network; Evolved Universal Terrestrial Radio Access (E-UTRA); Radio Resource Control (RRC); Protocol specification (Release 14)"

FIG. 18 is a Reproduction of FIG. 5.8.5.1-1

The purpose of this procedure is to inform E-UTRAN that the UE is receiving or is interested to receive MBMS service(s) via an MRB or SC-MRB, and if so, to inform E-UTRAN about the priority of MBMS versus unicast reception.
5.8.5.2 Initiation
An MBMS or SC-PTM capable UE in RRC_CONNECTED may initiate the procedure in several cases including upon successful connection establishment, upon entering or leaving the service area, upon session start or stop, upon change of interest, upon change of priority between MBMS reception and unicast reception or upon change to a PCell broadcasting SystemInformationBlockType15.

Upon initiating the procedure, the UE shall:
1>if SystemInformationBlockType15 is broadcast by the PCell:
  2>ensure having a valid version of SystemInformationBlockType15 for the PCell;
  2>if the UE did not transmit an MBMSInterestIndication message since last entering RRC_CONNECTED state; or
  2>if since the last time the UE transmitted an MBMSInterestIndication message, the UE connected to a PCell not broadcasting SystemInformationBlockType15:
    3>if the set of MBMS frequencies of interest, determined in accordance with 5.8.5.3, is not empty:
      4>initiate transmission of the MBMSInterestIndication message in accordance with 5.8.5.4;
  2>else:
    3>if the set of MBMS frequencies of interest, determined in accordance with 5.8.5.3, has changed since the last transmission of the MBMSInterestIndication message; or
    3>if the prioritisation of reception of all indicated MBMS frequencies compared to reception of any of the established unicast bearers has changed since the last transmission of the MBMSInterestIndication message:
      4>initiate transmission of the MBMSInterestIndication message in accordance with 5.8.5.4;
NOTE: The UE may send an MBMSInterestIndication even when it is able to receive the MBMS services it is interested in i.e. to avoid that the network allocates a configuration inhibiting MBMS reception.
    3>else if SystemInformationBlockType20 is broadcast by the PCell:
      4>if since the last time the UE transmitted an MBMSInterestIndication message, the UE connected to a PCell not broadcasting SystemInformationBlockType20; or
      4>if the set of MBMS services of interest determined in accordance with 5.8.5.3a is different from mbms-Services included in the last transmission of the MBMSInterestIndication message;
5>initiate the transmission of the MBMSInterestIndication message in accordance with 5.8.5.4.

5.8.5.3 Determine MBMS frequencies of interest

The UE shall:
1>consider a frequency to be part of the MBMS frequencies of interest if the following conditions are met:
  2>at least one MBMS session the UE is receiving or interested to receive via an MRB or SC-MRB is ongoing or about to start; and
NOTE 1: The UE may determine whether the session is ongoing from the start and stop time indicated in the User Service Description (USD), see 3GPP TS 36.300 [9] or 3GPP TS 26.346 [57].
  2>for at least one of these MBMS sessions SystemInformationBlockType15 acquired from the PCell includes for the concerned frequency one or more MBMS SAIs as indicated in the USD for this session; and NOTE 2: The UE considers a frequency to be part of the MBMS frequencies of interest even though E-UTRAN may (temporarily) not employ an MRB or SC-MRB for the concerned session. I.e. the UE does not verify if the session is indicated on (SC-)MCCH NOTE 3: The UE considers the frequencies of interest independently of any synchronization state, e.g. [9, Annex J.1]
  2>the UE is capable of simultaneously receiving MRBs and/or is capable of simultaneously receiving SC-MRBs on the set of MBMS frequencies of interest, regardless of whether a serving cell is configured on each of these frequencies or not; and
  2>the supportedBandCombination the UE included in UE-EUTRA-Capability contains at least one band combination including the set of MBMS frequencies of interest;

NOTE 4: Indicating a frequency implies that the UE supports SystemInformationBlockType13 or SystemInformationBlockType20 acquisition for the concerned frequency i.e. the indication should be independent of whether a serving cell is configured on that frequency.

NOTE 5: When evaluating which frequencies it can receive simultaneously, the UE does not take into account the serving frequencies that are currently configured i.e. it only considers MBMS frequencies it is interested to receive.

NOTE 6: The set of MBMS frequencies of interest includes at most one frequency for a given physical frequency. The UE only considers a physical frequency to be part of the MBMS frequencies of interest if it supports at least one of the bands indicated for this physical frequency in SystemInformationBlockType1 (for serving frequency) or SystemInformationBlockType15 (for neighbouring frequencies). In this case, E-UTRAN may assume the UE supports MBMS reception on any of the bands supported by the UE (i.e. according to supportedBandCombination).

5.8.5.3a Determine MBMS Services of Interest

The UE shall:
1>consider a MBMS service to be part of the MBMS services of interest if the following conditions are met:
  2>the UE is SC-PTM capable; and
  2>the UE is receiving or interested to receive this service via an SC-MRB; and
  2>one session of this service is ongoing or about to start; and 2>one or more MBMS SAIs in the USD for this service is included in SystemInformationBlockType15 acquired from the PCell for a frequency belonging to the set of MBMS frequencies of interest, determined according to 5.8.5.3.

5.8.5.4 Actions Related to Transmission of MBMSInterestIndication Message

The UE shall set the contents of the MBMSInterestIndication message as follows:
1>if the set of MBMS frequencies of interest, determined in accordance with 5.8.5.3, is not empty:
  2>include mbms-FreqList and set it to include the MBMS frequencies of interest sorted by decreasing order of interest, using the EARFCN corresponding with freqBandIndicator included in SystemInformationBlockType1 (for serving frequency), if applicable, and the EARFCN(s) as included in SystemInformationBlockType15 (for neighbouring frequencies);

NOTE 1: The EARFCN included in mbms-FreqList is merely used to indicate a physical frequency the UE is interested to receive i.e. the UE may not support the band corresponding to the included EARFCN (but it does support at least one of the bands indicated in system information for the concerned physical frequency).

2>include mbms-Priority if the UE prioritises reception of all indicated MBMS frequencies above reception of any of the unicast bearers;
2>if SystemInformationBlockType20 is broadcast by the PCell:
3>include mbms-Services and set it to indicate the set of MBMS services of interest determined in accordance with 5.8.5.3a;

NOTE 2: If the UE prioritises MBMS reception and unicast data cannot be supported because of congestion on the MBMS carrier(s), E-UTRAN may initiate release of unicast bearers. It is up to E-UTRAN implementation whether all bearers or only GBR bearers are released. E-UTRAN does not initiate re-establishment of the released unicast bearers upon alleviation of the congestion.

The UE shall submit the MBMSInterestIndication message to lower layers for transmission.

MBMSInterestIndication

The MBMSInterestIndication message is used to inform E-UTRAN that the UE is receiving/interested to receive or no longer receiving/interested to receive MBMS via an MRB or SC-MRB.

Signalling radio bearer: SRB1
RLC-SAP: AM
Logical channel: DCCH
Direction: UE to E-UTRAN MBMSInterestIndication Message

```
-- ASN1START
MBMSInterestIndication-r11 ::=          SEQUENCE {
    criticalExtensions                      CHOICE {
        c1                                      CHOICE {
            interestIndication-r11                  MBMSInterestIndication-r11-IEs,
            spare3 NULL, spare2 NULL, spare1 NULL
        },
        criticalExtensionsFuture                SEQUENCE { }
    }
}
MBMSInterestIndication-r11-IEs ::= SEQUENCE {
    mbms-FreqList-r11                       CarrierFreqListMBMS-r11
        OPTIONAL,
    mbms-Priority-r11                       ENUMERATED {true}
        OPTIONAL,
    lateNonCriticalExtension                OCTET STRING
        OPTIONAL,
    nonCriticalExtension                    MBMSInterestIndication-v1310-IEs
        OPTIONAL
}
MBMSInterestIndication-v1310-IEs ::=    SEQUENCE {
    mbms-Services-r13                       MBMS-ServiceList-r13
        OPTIONAL,
    nonCriticalExtension                    SEQUENCE { }
        OPTIONAL
}
-- ASN1STOP
```

| MBMSInterestIndication field descriptions |
|---|
| mbms-FreqList |
| List of MBMS frequencies on which the UE is receiving or interested to receive MBMS via an MRB or SC-MRB. |
| mbms-Priority |
| Indicates whether the UE prioritises MBMS reception above unicast reception. The field is present (i.e. value true), if the UE prioritises reception of all listed MBMS frequencies above reception of any of the unicast bearers. Otherwise the field is absent. |

MBMS-ServiceList

The IE MBMS-ServiceList provides the list of MBMS services which the UE is receiving or interested to receive.

MBMS-ServiceList Information Element

```
-- ASN1START
MBMS-ServiceList-r13 ::=        SEQUENCE (SIZE (0..maxMBMS-ServiceListPerUE-r13)) OF MBMS-ServiceInfo-r13
MBMS-ServiceInfo-r13 ::=            SEQUENCE {
    tmgi-r13                            TMGI-r9
}
-- ASN1STOP"
```

Section 5.3.3 of 3GPP TS 36.331 v.14.0.0 provides a general description of RRC states, and UE responses to different types of RRC messages, and is quoted in part below.

Figure 19:
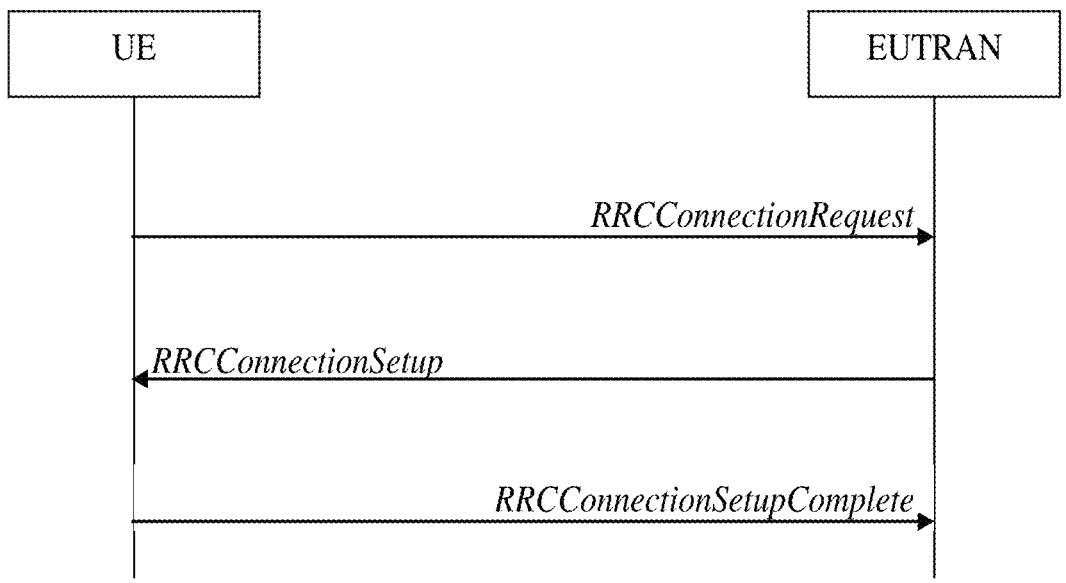
FIG. 19 is a reproduction of FIG. 5.3.3.1-1 from 3GPP TS 36.331 v.14.0.0 (October 2016), "3rd Generation Partnership Project; Technical Specification Group Radio Access Network; Evolved Universal Terrestrial Radio Access (E-UTRA); Radio Resource Control (RRC); Protocol specification (Release 14)"
Figure 20:
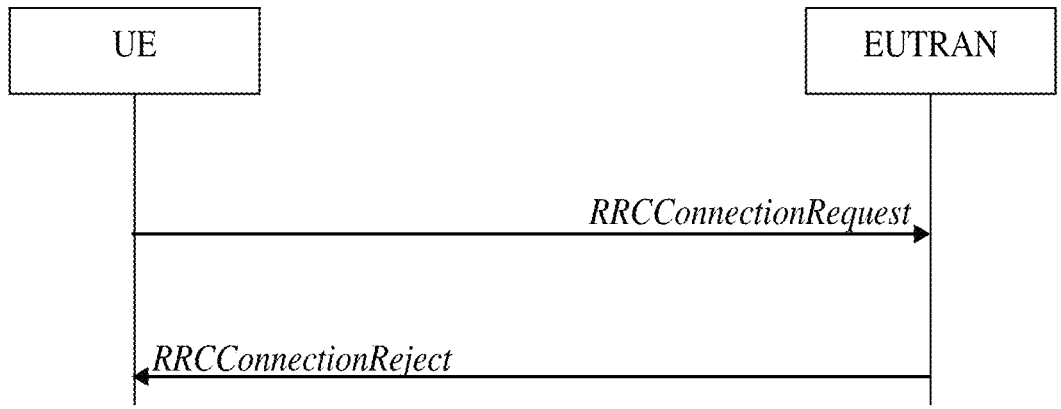
FIG. 20 is a reproduction of FIG. 5.3.3.1-2 from 3GPP TS 36.331 v.14.0.0 (October 2016), "3rd Generation Partnership Project; Technical Specification Group Radio Access Network; Evolved Universal Terrestrial Radio Access (E-UTRA); Radio Resource Control (RRC); Protocol specification (Release 14)"
Figure 21:
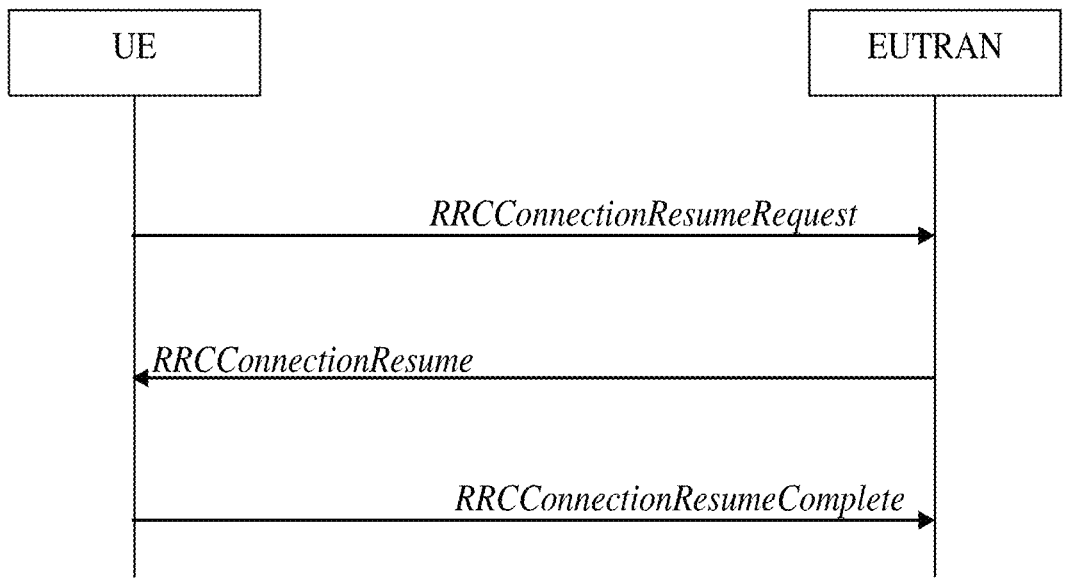
FIG. 21 is a reproduction of FIG. 5.3.3.1-3 from 3GPP TS 36.331 v.14.0.0 (October 2016), "3rd Generation Partnership Project; Technical Specification Group Radio Access Network; Evolved Universal Terrestrial Radio Access (E-UTRA); Radio Resource Control (RRC); Protocol specification (Release 14)"
Figure 22:
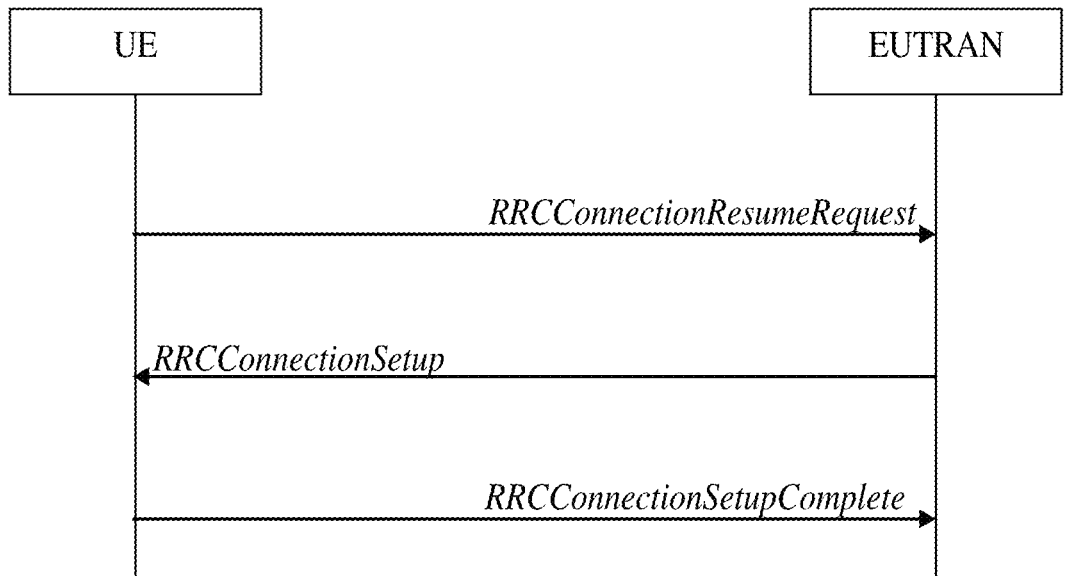
FIG. 22 is a reproduction of FIG. 5.3.3.1-4 from 3GPP TS 36.331 v.14.0.0 (October 2016), "3rd Generation Partnership Project; Technical Specification Group Radio Access Network; Evolved Universal Terrestrial Radio Access (E-UTRA); Radio Resource Control (RRC); Protocol specification (Release 14)"
Figure 23:
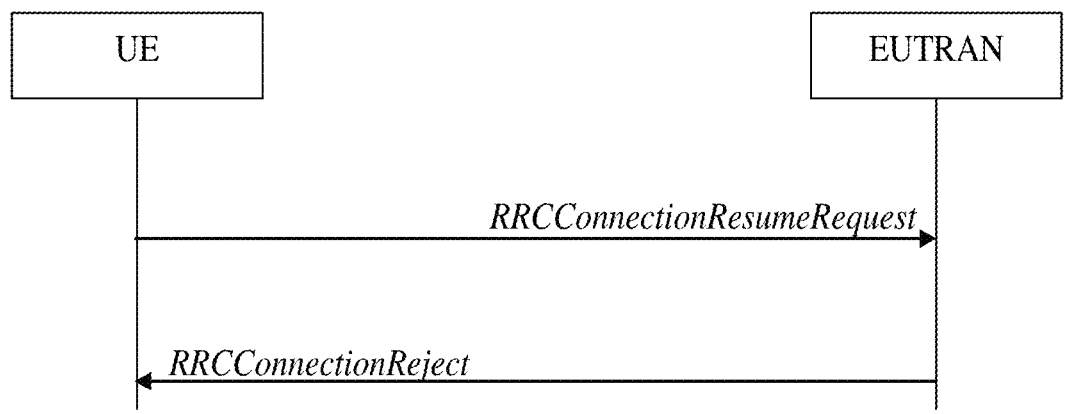
FIG. 23 is a reproduction of FIG. 5.3.3.1-5 from 3GPP TS 36.331 v.14.0.0 (October 2016), "3rd Generation Partnership Project; Technical Specification Group Radio Access Network; Evolved Universal Terrestrial Radio Access (E-UTRA); Radio Resource Control (RRC); Protocol specification (Release 14)".

"5.3.3 RRC connection establishment
5.3.3.1 General
[FIG. 19 is a reproduction of FIG. 5.3.3.1-1]
[FIG. 20 is a reproduction of FIG. 5.3.3.1-2]
[FIG. 21 is a reproduction of FIG. 5.3.3.1-3]
[FIG. 22 is a reproduction of FIG. 5.3.3.1-4]
[FIG. 23 is a reproduction of FIG. 5.3.3.1-5]
The purpose of this procedure is to establish or resume an RRC connection. RRC connection establishment involves SRB1 (and SRB1bis for NB-IoT) establishment. The procedure is also used to transfer the initial NAS dedicated information/message from the UE to E-UTRAN.

E-UTRAN applies the procedure as follows:
When establishing an RRC connection:
  to establish SRB1 and, for NB-IoT, SRB1bis;
When resuming an RRC connection:
  to restore the AS configuration from a stored context including resuming SRB(s) and DRB(s).

5.3.3.2 Initiation

The UE initiates the procedure when upper layers request establishment or resume of an RRC connection while the UE is in RRC_IDLE.

Except for NB-IoT, upon initiation of the procedure, the UE shall:
1> if SystemInformationBlockType2 includes ac-BarringPerPLMN-List and the ac-BarringPerPLMN-List contains an AC-BarringPerPLMN entry with the plmn-IdentityIndex corresponding to the PLMN selected by upper layers (see TS 23.122 [11], TS 24.301 [35]):
  2> select the AC-BarringPerPLMN entry with the plmn-IdentityIndex corresponding to the PLMN selected by upper layers;
  2> in the remainder of this procedure, use the selected AC-BarringPerPLMN entry (i.e. presence or absence of access barring parameters in this entry) irrespective of the common access barring parameters included in SystemInformationBlockType2;
1> else
  2> in the remainder of this procedure use the common access barring parameters (i.e. presence or absence of these parameters) included in SystemInformationBlockType2;
1> if SystemInformationBlockType2 contains A CDC-BarringPerPLMN-List and the ACDC-BarringPerPLMN-List contains an ACDC-BarringPerPLMN entry with the plmn-IdentityIndex corresponding to the PLMN selected by upper layers (see TS 23.122 [11], TS 24.301 [35]):
  2> select the ACDC-BarringPerPLMN entry with the plmn-IdentityIndex corresponding to the PLMN selected by upper layers;
  2> in the remainder of this procedure, use the selected ACDC-BarringPerPLMN entry for ACDC barring check (i.e. presence or absence of access barring parameters in this entry) irrespective of the ACDC-BarringForCommon parameters included in SystemInformationBlockType2;
1> else:
  2> in the remainder of this procedure use the ACDC-BarringForCommon (i.e. presence or absence of these parameters) included in SystemInformationBlockType2 for ACDC barring check;
1> if upper layers indicate that the RRC connection is subject to EAB (see TS 24.301 [35]):
  2> if the result of the EAB check, as specified in 5.3.3.12, is that access to the cell is barred:
    3> inform upper layers about the failure to establish the RRC connection or failure to resume the RRC connection with suspend indication and that EAB is applicable, upon which the procedure ends;
1> if upper layers indicate that the RRC connection is subject to ACDC (see TS 24.301 [35], SystemInformationBlockType2 contains BarringPerACDC-CategoryList, and acdc-HPLMNonly indicates that ACDC is applicable for the UE:
  2> if the BarringPerACDC-CategoryList contains a BarringPerACDC-Category entry corresponding to the ACDC category selected by upper layers:
    3> select the BarringPerACDC-Category entry corresponding to the ACDC category selected by upper layers;
  2> else:
    3> select the last BarringPerACDC-Category entry in the BarringPerACDC-CategoryList;
  2> stop timer T308, if running;
  2> perform access barring check as specified in 5.3.3.13, using T308 as "Tbarring" and acdc-BarringConfig in the BarringPerACDC-Category as "ACDC barring parameter";
  2> if access to the cell is barred:
    3> inform upper layers about the failure to establish the RRC connection or failure to resume the RRC connection with suspend indication and that access barring is applicable due to ACDC, upon which the procedure ends;
1> else if the UE is establishing the RRC connection for mobile terminating calls:
  2> if timer T302 is running:
    3> inform upper layers about the failure to establish the RRC connection or failure to resume the RRC connection with suspend indication and that access barring for mobile terminating calls is applicable, upon which the procedure ends;
1> else if the UE is establishing the RRC connection for emergency calls:
  2> if SystemInformationBlockType2 includes the ac-BarringInfo:
    3> if the ac-BarringForEmergency is set to TRUE:
      4> if the UE has one or more Access Classes, as stored on the USIM, with a value in the range 11 . . . 15, which is valid for the UE to use according to TS 22.011 [10] and TS 23.122 [11]:
NOTE 1: ACs 12, 13, 14 are only valid for use in the home country and ACs 11, 15 are only valid for use in the HPLMN/EHPLMN.
        5> if the ac-BarringInfo includes ac-BarringForMO-Data, and for all of these valid Access Classes for the UE, the corresponding bit in the ac-BarringForSpecialAC contained in ac-BarringForMO-Data is set to one:
          6> consider access to the cell as barred;
      4> else:
        5> consider access to the cell as barred;
  2> if access to the cell is barred:
    3> inform upper layers about the failure to establish the RRC connection or failure to resume the RRC connection with suspend indication, upon which the procedure ends;
1> else if the UE is establishing the RRC connection for mobile originating calls:
  2> perform access barring check as specified in 5.3.3.11, using T303 as "Tbarring" and ac-BarringForMO-Data as "AC barring parameter";
  2> if access to the cell is barred:
    3> if SystemInformationBlockType2 includes ac-BarringForCSFB or the UE does not support CS fallback:
      4> inform upper layers about the failure to establish the RRC connection or failure to resume the RRC connection with suspend indication and that access barring for mobile originating calls is applicable, upon which the procedure ends;
3>else (SystemInformationBlockType2 does not include ac-BarringForCSFB and the UE supports CS fallback):
4>if timer T306 is not running, start T306 with the timer value of T303;
4>inform upper layers about the failure to establish the RRC connection or failure to resume the RRC connection with suspend indication and that access barring for mobile originating calls and mobile originating CS fallback is applicable, upon which the procedure ends;
1>else if the UE is establishing the RRC connection for mobile originating signalling:
2>perform access barring check as specified in 5.3.3.11, using T305 as "Tbarring" and ac-BarringForMO-Signalling as "AC barring parameter";
2>if access to the cell is barred:
3>inform upper layers about the failure to establish the RRC connection or failure to resume the RRC connection with suspend indication and that access barring for mobile originating signalling is applicable, upon which the procedure ends;
1>else if the UE is establishing the RRC connection for mobile originating CS fallback:
2>if SystemInformationBlockType2 includes ac-BarringForCSFB:
3>perform access barring check as specified in 5.3.3.11, using T306 as "Tbarring" and ac-BarringForCSFB as "AC barring parameter";
3>if access to the cell is barred:
4>inform upper layers about the failure to establish the RRC connection or failure to resume the RRC connection with suspend indication and that access barring for mobile originating CS fallback is applicable, due to ac-BarringForCSFB, upon which the procedure ends;
2>else:
3>perform access barring check as specified in 5.3.3.11, using T306 as "Tbarring" and ac-BarringForMO-Data as "AC barring parameter";
3>if access to the cell is barred:
4>if timer T303 is not running, start T303 with the timer value of T306;
4>inform upper layers about the failure to establish the RRC connection or failure to resume the RRC connection with suspend indication and that access barring for mobile originating CS fallback and mobile originating calls is applicable, due to ac-BarringForMO-Data, upon which the procedure ends;
1>else if the UE is establishing the RRC connection for mobile originating MMTEL voice, mobile originating MMTEL video, mobile originating SMSoIP or mobile originating SMS:
2>if the UE is establishing the RRC connection for mobile originating MMTEL voice and SystemInformationBlockType2 includes ac-BarringSkipForMMTELVoice; or
2>if the UE is establishing the RRC connection for mobile originating MMTEL video and SystemInformationBlockType2 includes ac-BarringSkipForMMTELVideo; or
2>if the UE is establishing the RRC connection for mobile originating SMSoIP or SMS and SystemInformationBlockType2 includes ac-BarringSkipForSMS:
3>consider access to the cell as not barred;
2>else:
3>if establishmentCause received from higher layers is set to mo-Signalling (including the case that mo-Signalling is replaced by highPriorityAccess according to 3GPP TS 24.301 [35] or by mo-VoiceCall according to the subclause 5.3.3.3):
4>perform access barring check as specified in 5.3.3.11, using T305 as "Tbarring" and ac-BarringForMO-Signalling as "AC barring parameter";
4>if access to the cell is barred:
5>inform upper layers about the failure to establish the RRC connection or failure to resume the RRC connection with suspend indication and that access barring for mobile originating signalling is applicable, upon which the procedure ends;
3>if establishmentCause received from higher layers is set to mo-Data (including the case that mo-Data is replaced by highPriorityAccess according to 3GPP TS 24.301 [35] or by mo-VoiceCall according to the subclause 5.3.3.3):
4>perform access barring check as specified in 5.3.3.11, using T303 as "Tbarring" and ac-BarringForMO-Data as "AC barring parameter";
4>if access to the cell is barred:
5>if SystemInformationBlockType2 includes ac-BarringForCSFB or the UE does not support CS fallback:
6>inform upper layers about the failure to establish the RRC connection or failure to resume the RRC connection with suspend indication and that access barring for mobile originating calls is applicable, upon which the procedure ends;
5>else (SystemInformationBlockType2 does not include ac-BarringForCSFB and the UE supports CS fallback):
6>if timer T306 is not running, start T306 with the timer value of T303;
6>inform upper layers about the failure to establish the RRC connection or failure to resume the RRC connection with suspend indication and that access barring for mobile originating calls and mobile originating CS fallback is applicable, upon which the procedure ends;
1>if the UE is resuming an RRC connection:
2>release the MCG SCell(s), if configured, in accordance with 5.3.10.3a;
2>release powerPrefIndicationConfig, if configured and stop timer T340, if running;
2>release reportProximityConfig and clear any associated proximity status reporting timer;
2>release obtainLocationConfig, if configured;
2>release idc-Config, if configured;
2>release measSubframePatternPCell, if configured;
2>release the entire SCG configuration, if configured, except for the DRB configuration (as configured by drb-ToAddModListSCG);
2>release naics-Info for the PCell, if configured;
2>release the LWA configuration, if configured, as described in 5.6.14.3;

2>release the LWIP configuration, if configured, as described in 5.6.17.3;
1>apply the default physical channel configuration as specified in 9.2.4;
1>apply the default semi-persistent scheduling configuration as specified in 9.2.3;
1>apply the default MAC main configuration as specified in 9.2.2;
1>apply the CCCH configuration as specified in 9.1.1.2;
1>apply the timeAlignmentTimerCommon included in SystemInformationBlockType2;
1>start timer T300;
1>if the UE is resuming an RRC connection:
    2>initiate transmission of the RRCConnectionResumeRequest message in accordance with 5.3.3.3a;
1>else:
    2>if stored, discard the UE AS context and resumeIdentity;
    2>initiate transmission of the RRCConnectionRequest message in accordance with 5.3.3.3;
NOTE 2: Upon initiating the connection establishment procedure, the UE is not required to ensure it maintains up to date system information applicable only for UEs in RRC_IDLE state. However, the UE needs to perform system information acquisition upon cell re-selection.

For NB-IoT, upon initiation of the procedure, the UE shall:
1>if the UE is establishing or resuming the RRC connection for mobile originating exception data; or
1>if the UE is establishing or resuming the RRC connection for mobile originating data; or
1>if the UE is establishing or resuming the RRC connection for delay tolerant access; or
1>if the UE is establishing or resuming the RRC connection for mobile originating signalling;
    2>perform access barring check as specified in 5.3.3.14;
    2>if access to the cell is barred:
        3>inform upper layers about the failure to establish the RRC connection or failure to resume the RRC connection with suspend indication and that access barring is applicable, upon which the procedure ends;
1>apply the default physical channel configuration as specified in 9.2.4;
1>apply the default MAC main configuration as specified in 9.2.2;
1>apply the CCCH configuration as specified in 9.1.1.2;
1>start timer T300;
1>if the UE is establishing an RRC connection:
    2>initiate transmission of the RRCConnectionRequest message in accordance with 5.3.3.3;
1>else if the UE is resuming an RRC connection:
    2>initiate transmission of the RRCConnectionResumeRequest message in accordance with 5.3.3.3a;
NOTE 3: Upon initiating the connection establishment or resumption procedure, the UE is not required to ensure it maintains up to date system information applicable only for UEs in RRC_IDLE state. However, the UE needs to perform system information acquisition upon cell re-selection.

5.3.3.3 Actions Related to Transmission of RRCConnectionRequest Message

The UE shall set the contents of RRCConnectionRequest message as follows:
1>set the ue-Identity as follows:
    2>if upper layers provide an S-TMSI:
        3>set the ue-Identity to the value received from upper layers;
    2>else:
        3>draw a random value in the range $0 \ldots 2^{40}-1$ and set the ue-Identity to this value;
NOTE 1: Upper layers provide the S-TMSI if the UE is registered in the TA of the current cell.
1>if the UE supports mo-VoiceCall establishment cause and UE is establishing the RRC connection for mobile originating MMTEL voice and SystemInformationBlockType2 includes voiceServiceCauseIndication:
    2>set the establishmentCause to mo-VoiceCall;
1>else:
    2>set the establishmentCause in accordance with the information received from upper layers;
1>if the UE is a NB-IoT UE:
    2>if the UE supports multi-tone transmission, include multiToneSupport;
    2>if the UE supports multi-carrier operation, include multiCarrierSupport;

The UE shall submit the RRCConnectionRequest message to lower layers for transmission.

The UE shall continue cell re-selection related measurements as well as cell re-selection evaluation. If the conditions for cell re-selection are fulfilled, the UE shall perform cell re-selection as specified in 5.3.3.5.

5.3.3.3a Actions Related to Transmission of RRCConnectionResumeRequest Message

The UE shall set the contents of RRCConnectionResumeRequest message as follows:
1>if the UE is a NB-IoT UE; or
1>if field useFullResumeID is signalled in SystemInformationBlockType2:
    2>set the resumeID to the stored resumeIdentity;
1>else
    2>set the truncatedResumeID to include bits in bit position 9 to 20 and 29 to 40 from the left in the stored resumeIdentity.
1>if the UE supports mo-VoiceCall establishment cause and UE is resuming the RRC connection for mobile originating MMTEL voice and SystemInformationBlockType2 includes voiceServiceCauseIndication:
    2>set the resumeCause to mo-VoiceCall;
1>else
    2>set the resumeCause in accordance with the information received from upper layers;
1>set the shortResumeMAC-I to the 16 least significant bits of the MAC-I calculated:
    2>over the ASN.1 encoded as per section 8 (i.e., a multiple of 8 bits) VarShortResumeMAC-Input (or VarShortResumeMAC-Input-NB in NB-IoT);
    2>with the $K_{RRCInt}$ key and the previously configured integrity protection algorithm; and
    2>with all input bits for COUNT, BEARER and DIRECTION set to binary ones;

The UE shall submit the RRCConnectionResumeRequest message to lower layers for transmission.

The UE shall continue cell re-selection related measurements as well as cell re-selection evaluation. If the conditions for cell re-selection are fulfilled, the UE shall perform cell re-selection as specified in 5.3.3.5.

5.3.3.4 Reception of the RRCConnectionSetup by the UE
NOTE: Prior to this, lower layer signalling is used to allocate a C-RNTI. For further details see TS 36.321 [6];
The UE shall:
1>if the RRCConnectionSetup is received in response to an RRCConnectionResumeRequest:

2>discard the stored UE AS context and resumeIdentity;
2>indicate to upper layers that the RRC connection resume has been fallbacked;
1>perform the radio resource configuration procedure in accordance with the received radioResourceConfigDedicated and as specified in 5.3.10;
1>if stored, discard the cell reselection priority information provided by the idleModeMobilityControlInfo or inherited from another RAT;
1>stop timer T300;
1>stop timer T302, if running;
1>stop timer T303, if running;
1>stop timer T305, if running;
1>stop timer T306, if running;
1>stop timer T308, if running;
1>perform the actions as specified in 5.3.3.7;
1>stop timer T320, if running;
1>stop timer T350, if running;
1>perform the actions as specified in 5.6.12.4;
1>release rclwi-Configuration, if configured, as specified in 5.6.16.2;
1>stop timer T360, if running;
1>enter RRC_CONNECTED;
1>stop the cell re-selection procedure;
1>consider the current cell to be the PCell;
1>set the content of RRCConnectionSetupComplete message as follows:
  2>if the RRCConnectionSetup is received in response to an RRCConnectionResumeRequest:
    3>if upper layers provide an S-TMSI:
      4>set the s-TMSI to the value received from upper layers;
  2>set the selectedPLMN-Identity to the PLMN selected by upper layers (see TS 23.122 [11], TS 24.301 [35]) from the PLMN(s) included in the plmn-IdentityList in SystemInformationBlockType1 (or SystemInformationBlockType1-NB in NB-IoT);
  2>if upper layers provide the 'Registered MME', include and set the registeredMME as follows:
    3>if the PLMN identity of the 'Registered MME' is different from the PLMN selected by the upper layers:
      4>include the plmnIdentity in the registeredMME and set it to the value of the PLMN identity in the 'Registered MME' received from upper layers;
    3>set the mmegi and the mmec to the value received from upper layers;
  2>except for NB-IoT, if upper layers provided the 'Registered MME':
    3>include and set the gummei-Type to the value provided by the upper layers;
  2>if the UE supports CIoT EPS optimisation(s):
    3>include attachWithoutPDN-Connectivity if received from upper layers;
    3>include up-GMT-EPS-Optimisation if received from upper layers;
    3>except for NB-IoT, include cp-CIoT-EPS-Optimisation if received from upper layers;
  2>if connecting as an RN:
    3>include the rn-SubframeConfigReq;
  2>set the dedicatedInfoNAS to include the information received from upper layers;
  2>except for NB-IoT:
    3>if the UE has radio link failure or handover failure information available in VarRLF-Report and if the RPLMN is included in plmn-IdentityList stored in VarRLF-Report:
      4>include rlf-InfoAvadable;
    3>if the UE has MBSFN logged measurements available for E-UTRA and if the RPLMN is included in plmn-IdentityList stored in VarLogMeasReport:
      4>include logMeasAvailableMBSFN;
    3>else if the UE has logged measurements available for E-UTRA and if the RPLMN is included in plmn-IdentityList stored in VarLogMeasReport:
      4>include logMeasAvailable;
    3>if the UE has connection establishment failure information available in VarConnEstFailReport and if the RPLMN is equal to plmn-Identity stored in VarConnEstFailReport:
      4>include connEstFadInfoAvadable;
    3>include the mobilityState and set it to the mobility state (as specified in TS 36.304 [4]) of the UE just prior to entering RRC_CONNECTED state;
    3>if the UE supports storage of mobility history information and the UE has mobility history information available in VarMobilityHistoryReport:
      4>include the mobilityHistoryAvail;
  2>if UE needs UL gaps during continuous uplink transmission:
    3>include ue-CE-NeedULGaps;
  2>submit the RRCConnectionSetupComplete message to lower layers for transmission, upon which the procedure ends;

5.3.3.4a Reception of the RRCConnectionResume by the UE

The UE shall:
1>stop timer T300;
1>restore the RRC configuration and security context from the stored UE AS context:
1>restore the PDCP state and re-establish PDCP entities for all SRBs and DRBs;
1>if drb-ContinueROHC is included:
  2>indicate to lower layers that stored UE AS context is used and that drb-ContinueROHC is configured;
  2>continue the header compression protocol context for the DRB s configured with the header compression protocol;
1>else:
  2>indicate to lower layers that stored UE AS context is used;
  2>reset the header compression protocol context for the DRBs configured with the header compression protocol;
1>discard the stored UE AS context and resumeIdentity;
1>perform the radio resource configuration procedure in accordance with the received radioResourceConfigDedicated and as specified in 5.3.10;
1>resume SRBs and DRBs;
1>if stored, discard the cell reselection priority information provided by the idleModeMobilityControlInfo or inherited from another RAT;
1>if the RRCConnectionResume message includes the measConfig:
  2>perform the measurement configuration procedure as specified in 5.5.2;
1>stop timer T302, if running;
1>stop timer T303, if running;

1>stop timer T305, if running;
1>stop timer T306, if running;
1>stop timer T308, if running;
1>perform the actions as specified in 5.3.3.7;
1>stop timer T320, if running;
1>stop timer T350, if running;
1>perform the actions as specified in 5.6.12.4;
1>stop timer T360, if running;
1>update the $K_{eNB}$ key based on the $K_{ASME}$ key to which the current $K_{eNB}$ is associated, using the nextHopChainingCount value indicated in the RRCConnectionResume message, as specified in TS 33.401 [32];
1>store the nextHopChainingCount value;
1>derive the $K_{RRCInt}$ key associated with the previously configured integrity algorithm, as specified in TS 33.401 [32];
1>request lower layers to verify the integrity protection of the RRCConnectionResume message, using the previously configured algorithm and the $K_{RRCInt}$ key;
1>if the integrity protection check of the RRCConnectionResume message fails:
2>perform the actions upon leaving RRC_CONNECTED as specified in 5.3.12, with release cause 'other', upon which the procedure ends;
1>derive the $K_{RRCenc}$ key and the $K_{UPenc}$ key associated with the previously configured ciphering algorithm, as specified in TS 33.401 [32];
1>configure lower layers to activate integrity protection using the previously configured algorithm and the $K_{RRCInt}$ key immediately, i.e., integrity protection shall be applied to all subsequent messages received and sent by the UE;
1>configure lower layers to apply the ciphering algorithm, the $K_{RRCenc}$ key and the $K_{UPenc}$ key, i.e. the ciphering configuration shall be applied to all subsequent messages received and sent by the UE;
1>enter RRC_CONNECTED;
1>indicate to upper layers that the suspended RRC connection has been resumed;
1>stop the cell re-selection procedure;
1>consider the current cell to be the PCell;
1>set the content of RRCConnectionResumeComplete message as follows:
2>set the selectedPLMN-Identity to the PLMN selected by upper layers (see TS 23.122 [11], TS 24.301 [35]) from the PLMN(s) included in the plmn-IdentityList in SystemInformationBlockType1;
2>set the dedicatedInfoNAS to include the information received from upper layers;
2>except for NB-IoT:
3>if the UE has radio link failure or handover failure information available in VarRLF-Report and if the RPLMN is included in plmn-IdentityList stored in VarRLF-Report:
4>include rlf-InfoAvadable;
3>if the UE has MBSFN logged measurements available for E-UTRA and if the RPLMN is included in plmn-IdentityList stored in VarLogMeasReport:
4>include logMeasAvailableMBSFN;
3>else if the UE has logged measurements available for E-UTRA and if the RPLMN is included in plmn-IdentityList stored in VarLogMeasReport:
4>include logMeasAvailable;
3>if the UE has connection establishment failure information available in VarConnEstFailReport and if the RPLMN is equal to plmn-Identity stored in VarConnEstFailReport:
4>include connEstFailInfoAvailable;
3>include the mobilityState and set it to the mobility state (as specified in TS 36.304 [4]) of the UE just prior to entering RRC_CONNECTED state;
3>if the UE supports storage of mobility history information and the UE has mobility history information available in VarMobilityHistoryReport:
4>include mobilityHistoryAvail;
1>submit the RRCConnectionResumeComplete message to lower layers for transmission;
1>the procedure ends.

5.3.3.8 Reception of the RRCConnectionReject by the UE
The UE shall:
1>stop timer T300;
1>reset MAC and release the MAC configuration;
1>except for NB-IoT, start timer T302, with the timer value set to the waitTime;
1>if the UE is a NB-IoT UE; or
1>if the extendedWaitTime is present and the UE supports delay tolerant access:
2>forward the extendedWaitTime to upper layers;
1>if deprioritisationReq is included and the UE supports RRC Connection Reject with deprioritisation:
2>start or restart timer T325 with the timer value set to the deprioritisationTimer signalled;
2>store the deprioritisationReq until T325 expiry;
NOTE: The UE stores the deprioritisation request irrespective of any cell reselection absolute priority assignments (by dedicated or common signalling) and regardless of RRC connections in E-UTRAN or other RATs unless specified otherwise.
1>if the RRCConnectionReject is received in response to an RRCConnectionResumeRequest:
2>if the rrc-SuspendIndication is not present:
3>discard the stored UE AS context and resumeIdentity;
3>inform upper layers about the failure to resume the RRC connection without suspend indication and that access barring for mobile originating calls, mobile originating signalling, mobile terminating access and except for NB-IoT for mobile originating CS fallback is applicable, upon which the procedure ends;
2>else:
3>inform upper layers about the failure to resume the RRC connection with suspend indication and that access barring for mobile originating calls, mobile originating signalling, mobile terminating access and except for NB-IoT for mobile originating CS fallback is applicable, upon which the procedure ends;
1>else
2>inform upper layers about the failure to establish the RRC connection and that access barring for mobile originating calls, mobile originating signalling, mobile terminating access and except for NB-IoT, for mobile originating CS fallback is applicable, upon which the procedure ends;

5.3.12 UE Actions Upon Leaving RRC_CONNECTED
Upon leaving RRC_CONNECTED, the UE shall:
1>reset MAC;
1>stop all timers that are running except T320, T325 and T330;
1>if leaving RRC_CONNECTED was triggered by suspension of the RRC:

2>re-establish RLC entities for all SRBs and DRBs;
2>store the UE AS Context including the current RRC configuration, the current security context, the PDCP state including ROHC state, C-RNTI used in the source PCell, the cellIdentity and the physical cell identity of the source PCell;
2>store the following information provided by E-UTRAN:
3>the resumeIdentity;
2>suspend all SRB(s) and DRB(s);
2>indicate the suspension of the RRC connection to upper layers;
1>else:
2>release all radio resources, including release of the RLC entity, the MAC configuration and the associated PDCP entity for all established RBs;
2>indicate the release of the RRC connection to upper layers together with the release cause;
1>if leaving RRC_CONNECTED was triggered neither by reception of the MobilityFromEUTRACommand message nor by selecting an inter-RAT cell while T311 was running:
2>if timer T350 is configured:
3>start timer T350;
3>apply rclwi-Configuration if configured, otherwise apply the wlan-Id-List corresponding to the RPLMN included in SystemInformationBlockType17;
2>else:
3>release the wlan-OffloadConfigDedicated, if received;
3>if the wlan-OffloadConfigCommon corresponding to the RPLMN is broadcast by the cell:
4>apply the wlan-OffloadConfigCommon corresponding to the RPLMN included in SystemInformationBlockType17;
4>apply steerToWLAN if configured, otherwise apply the wlan-Id-List corresponding to the RPLMN included in SystemInformationBlockType17;
2>enter RRC_IDLE and perform procedures as specified in TS 36.304 [4, 5.2.7];
1>else:
2>release the wlan-OffloadConfigDedicated, if received;
NOTE: BL UEs or UEs in CE verifies validity of SI when released to RRC_IDLE.
1>indicate the release of LWA configuration, if configured, to upper layers;
1>release the LWIP configuration, if configured, as described in 5.6.17.3;"

For the purposes of this disclosure, the following terms may be used, and exemplary and non-limiting descriptions are provided:

gNB, gNodeB: a base station in 5G New Radio (NR)
NR-DTCH: New Radio Dedicated Traffic Channel. A channel used to convey packet(s) of unicast service(s) in NR. It may be the same as or similar to a Dedicated Traffic Channel (DTCH) in LTE.
Low-end UE: a user equipment (UE) that does not support simultaneous communications with a network via more than one or more numerologies.
MBMS Service Area (MBMS SA): The area within which data of a specific MBMS session are sent. Each individual MBMS session of an MBMS Bearer Service may be sent to a different MBMS Service Area [e.g., 3GPP TS 23.246 v.14.1.0].
A cell could belong to one or more MBMS SAs, and therefore is addressable by one or more MBMS SAIs [e.g., 3GPP TS 23.003 v.14.2.0].
NR-MCCH: New Radio Multicast Control Channel. A channel used to convey control information related to broadcast or multicast service(s) in NR. It may be the same as or similar to Multicast Control Channel (MCCH) or Single Cell Multicast Control Channel (SC-MCCH) in LTE [e.g., 3GPP TS 36.331 v.14.0.0].
NR-MCH: New Radio Multicast Channel. A channel used to convey packet(s) from NR-MCCH and NR-MTCH.
NR-MTCH: New Radio Multicast Traffic Channel. A channel used to convey packet(s) of broadcast or multicast service(s) in NR. It may be the same as or similar to Multicast Traffic Channel (MTCH) or Single Cell Multicast Traffic Channel (SC-MTCH) in LTE [e.g., 3GPP TS 36.331 v14.0.0].
Broadcast or multicast service: packet(s) of a broadcast or multicast service is provided to multiple UEs at once via broadcast or multicast manner. It may be MBMS service, Vehicle-to-Everything (V2X service), or for download, streaming, group communication, or TV.
Numerology: it could refer to a set of parameters which are used to define a frame structure and/or subframe structure. The set of parameters may include at least sub-carrier spacing, symbol length, cyclic prefix (CP) length, and/or TTI length.
Interest indication for broadcast or multicast: an indication used to notify the gNB that the UE is interested in reception of broadcast or multicast service(s). The indication may provide information related to the broadcast or multicast service(s) that the UE is interested in, e.g. frequency, service ID, and/or etc.
System information (SI) for broadcast or multicast: system information conveying configuration and/or information related to broadcast or multicast, e.g. configuration of NR-MCCH, configuration of NR-MCCH change notification, information of MBSFN area, information of broadcast or multicast service area, and/or etc. The SI may carry some or all of parameters carried by system information for MBMS in LTE, e.g. SystemInformationBlockType13, SystemInformationBlockType15, and/or SystemInformationBlockType20 [e.g., 3GPP TS 36.331 v.14.0.0].
TMGI: Temporary Mobile Group Identity. A TMGI can be used to identify one broadcast or multicast bearer service inside one pubic land mobile network (PLMN) in LTE [e.g., 3GPP TS 23.246 v14.1.0].
TTI: Transmission Time Interval, a scheduling unit in the time domain. TTI length is related to length of slot and/or symbol associated with the TTI, and/or related to numerology associated with the TTI.
USD: User Service Description, in which the application/service layer provides for each broadcast or multicast service the identity (e.g. TMGI in LTE), the session start and end time, the frequencies and/or etc. In LTE, USD further provides the MBMS service area identities belonging to the MBMS service area [TS36.300 v14.0.0].

Figure 2:
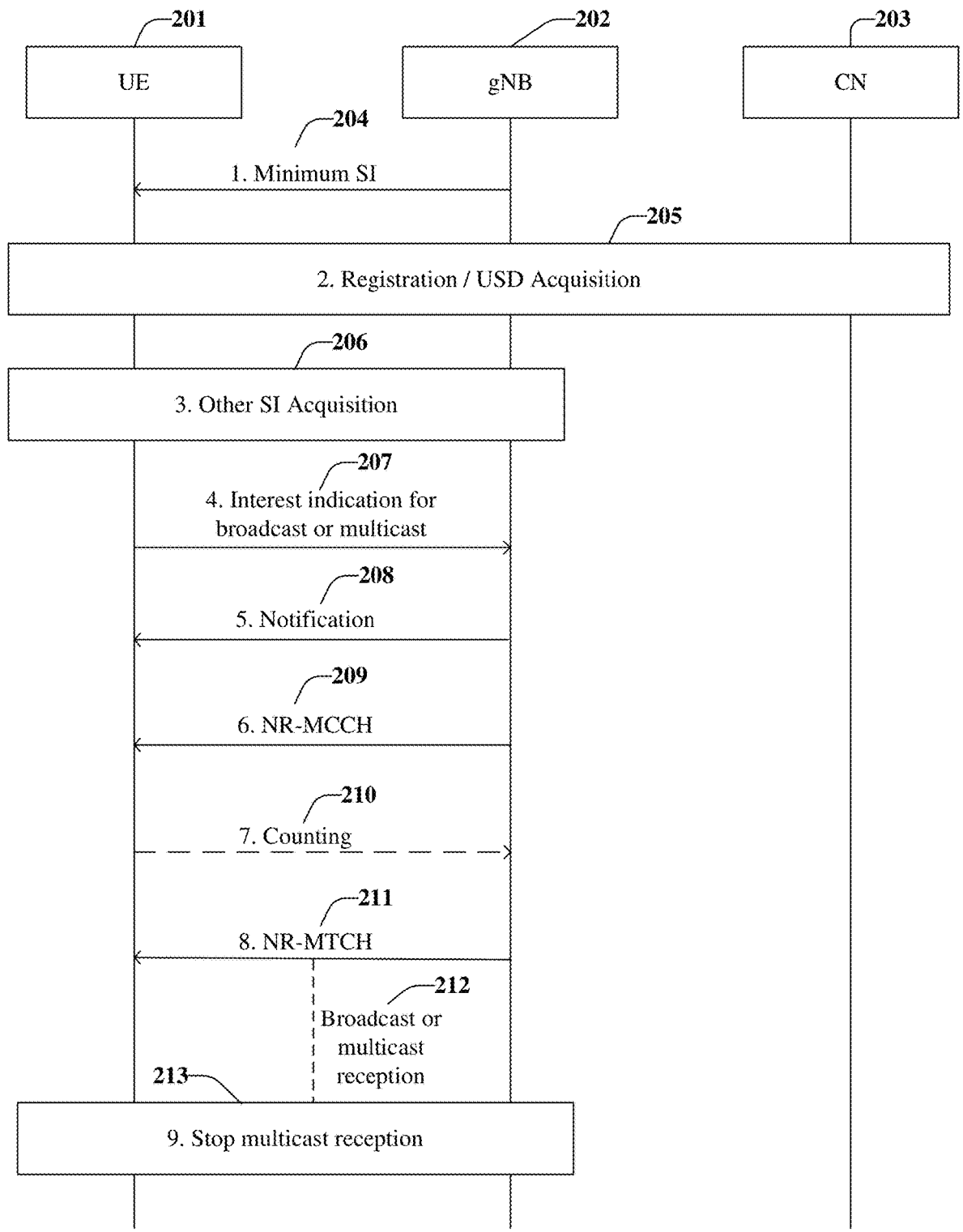
FIG. 2 illustrates an example, non-limiting flow diagram for acquiring a broadcast or a multicast service of interest, in accordance with one or more embodiments described herein.

Turning to FIG. 2, illustrated is a possible procedure in NR, similar to that used for LTE, for broadcasting system information, including system information relating to broadcast or multicast service. The procedure illustrated herein includes three devices: UE 201, gNodeB 202, and core network 203. To inform the network about interest for reception of broadcast or multicast service, a UE in RRC_CONNECTED may send an interest indication for broadcast or multicast to a gNB. Based on the interest indication, the gNB may try to attempt to guarantee UE reception of the broadcast or multicast service, e.g., by determining proper serving cell(s) for the UE. As illustrated in FIG. 2, gNB 202 is the serving cell (i.e., the cell to which a UE is attached) for UE 201, and supports a broadcast or multicast service of interest. The delivery of broadcast or multicast services occurs in the following sequence:

At power on, the UE 201 performs cell selection and attaches to/camps on a suitable cell. The UE 201 receives from the gNB 202 minimum system information (Minimum SI) 204, which is periodically broadcast by gNodeB 202. Minimum SI 204 includes basic information required for initial access to a cell, and information for acquiring any other system information (SI). The other SI (Other SI) includes any other information not included in Minimum SI 204, and may be broadcast, or provisioned in a dedicated manner as triggered by the network or upon request from the UE 201. In LTE, system information relating to MBMS is provided in System Information Blocks (SIB), e.g., SystemInformationBlockType2, SystemInformationBlockType13, SystemInformationBlockType15, SystemInformationBlock20. Based on the Minimum SI 204, the UE 201 can determine if Other SI relating to broadcast or multicast service availability for that cell.

At Step 205, the UE 201 performs an initial attach to the network, enters the RRC_CONNECTED state, and completes registration and authorization/authentication process. The UE 201 may establish a packet data network (PDN) connection with a broadcast or multicast entity in the core network (CN) 203, and acquire User Service Description (USD) information from the broadcast or multicast entity.

In order to access broadcast or multicast services, the UE 201 may require configuration information for reception of the broadcast or multicast service. The configuration information can be provided to the UE 201 in a system information, which may be provided in an Other SI. To initiate Other SI acquisition at Step 206, the UE 201 may trigger transmission of the Other SI from the gNB 202 by sending a request, e.g., a RRC message or a MAC control element.

The UE 201 transmits an interest indication 207 for broadcast or multicast to the gNB 202 to guarantee reception of the broadcast or multicast service of interest. An example of an interest indication message in LTE is MBMSInterestIndication. The UE 201 then monitors the New Radio Multicast Control Channel (NR-MCCH) for a notification 208 from the gNB 202 that indicates change of control information. If the UE 201 receives the notification 208, the UE 201 receives new control information on NR-MCCH 209.

Upon start of the broadcast or multicast service of interest, the UE 201 may require a broadcast or multicast counting based on new control information received on NR-MCCH 209. Based on the received control information, the UE 201 can configure itself for receipt of broadcast or multicast service over a New Radio Multicast Traffic Channel (NR-MTCH). If a broadcast or multicast counting is required for the broadcast or multicast service of interest, then the UE 201 transmits a counting response 210 to the gNB 202. Based on control information received on NR-MCCH 209 (and New Radio Multicast Channel (NR-MCH) scheduling information), the UE 201 receives the broadcast or multicast service of interest over NR-MTCH 211. When the session for the broadcast or multicast service 212 concludes (or if the UE terminates the session), at Step 213, the UE 201 stops monitoring for receptions relating to broadcast or multicast service.

In the context of broadcast or multicast, Other SI for NR may comprise on-demand system information. The UE 201 may obtain the Other SI by sending a request to the gNB 202. Upon receipt of the Other SI from the gNB 202, the UE 201 may further transmit a broadcast or multicast interest indication 207 to the gNB 202.

The LTE, UMTS, and proposed 5G specifications define certain Radio Resource Control (RRC) states, which vary in the amount of radio resources allocated to the UE. In the RRC_CONNECTED state, the UE establishes a connection and can transmit and receive data. In RRC_IDLE, the UE cannot transmit or receive data, but can, among other things, monitor the paging channel and perform cell selection and reselection. It will be appreciated that a UE can switch between states, and return to a previous state, e.g. from RRC_CONNECTED to RRC_IDLE back to RRC_CONNECTED. In LTE, the UE transmits an MBMSInterestIndication to the eNodeB if the UE did not transmit an MBMSInterestIndication message to the eNodeB since last entering the RRC_CONNECTED state. For 5G NR, an intermediate state, RRC_INACTIVE, has been proposed, in which the UE may still transmit and receive data, but allocated radio resources are reduced, in comparison with RRC_CONNECTED. The UE cannot transmit an interest indication for a broadcast or multicast service of interest in the RRC_INACTIVE or RRC_IDLE states, but may do so in the RRC_CONNECTED state.

Figure 3:
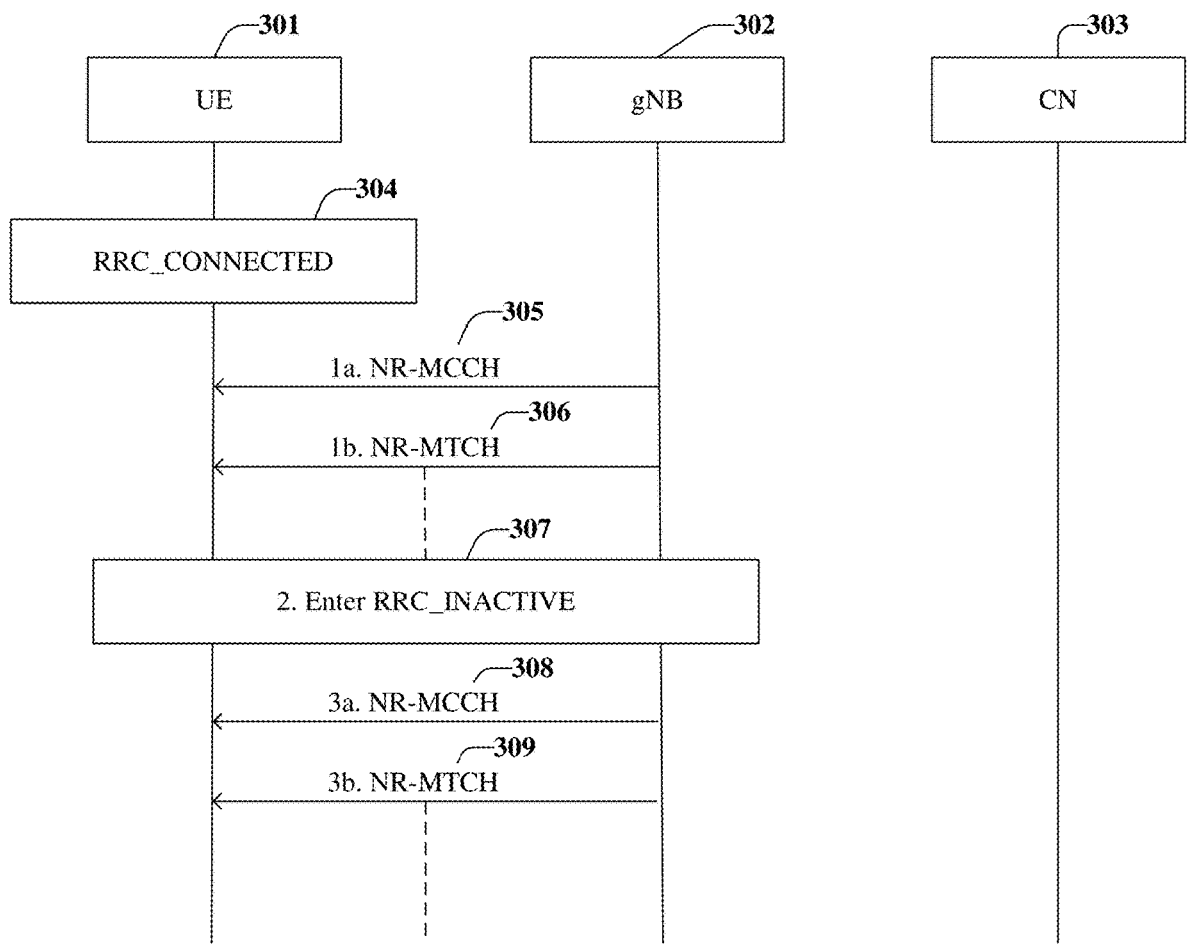
FIG. 3 illustrates an example, non-limiting flow diagram for continuing reception of a broadcast or multicast service of interest after a UE has entered an RRC_INACTIVE state from an RRC_CONNECTED state.

FIG. 3 illustrates an example, non-limiting scenario of the interaction of between RRC states and the receipt of a broadcast or multicast service of interest. In this scenario, no UE mobility is assumed, and UE 301 has established an RRC connection with gNB 302. At Step 304, UE 301 has entered the RRC_CONNECTED state. In that state, UE 301 receives control information over NR-MCCH 305 and the broadcast or multicast service of interest over NR-MTCH 306. CN 303 may contain a broadcast or multicast entity for the broadcast or multicast service of interest, as described above with respect to FIG. 2 At Step 307, after the transmission of the broadcast or multicast service of interest has started, gNB 302 may transmit a RRC state change command to UE 301, causing it to enter the RRC_INACTIVE state. gNB 302 may transmit the RRC state change command where, e.g., the UE does not have any ongoing unicast services. While in RRC_INACTIVE, UE 301 is able to continue receipt of transmissions from gNB 302 over NR-MCCH 308 and NR-MTCH 309.

Figure 4:
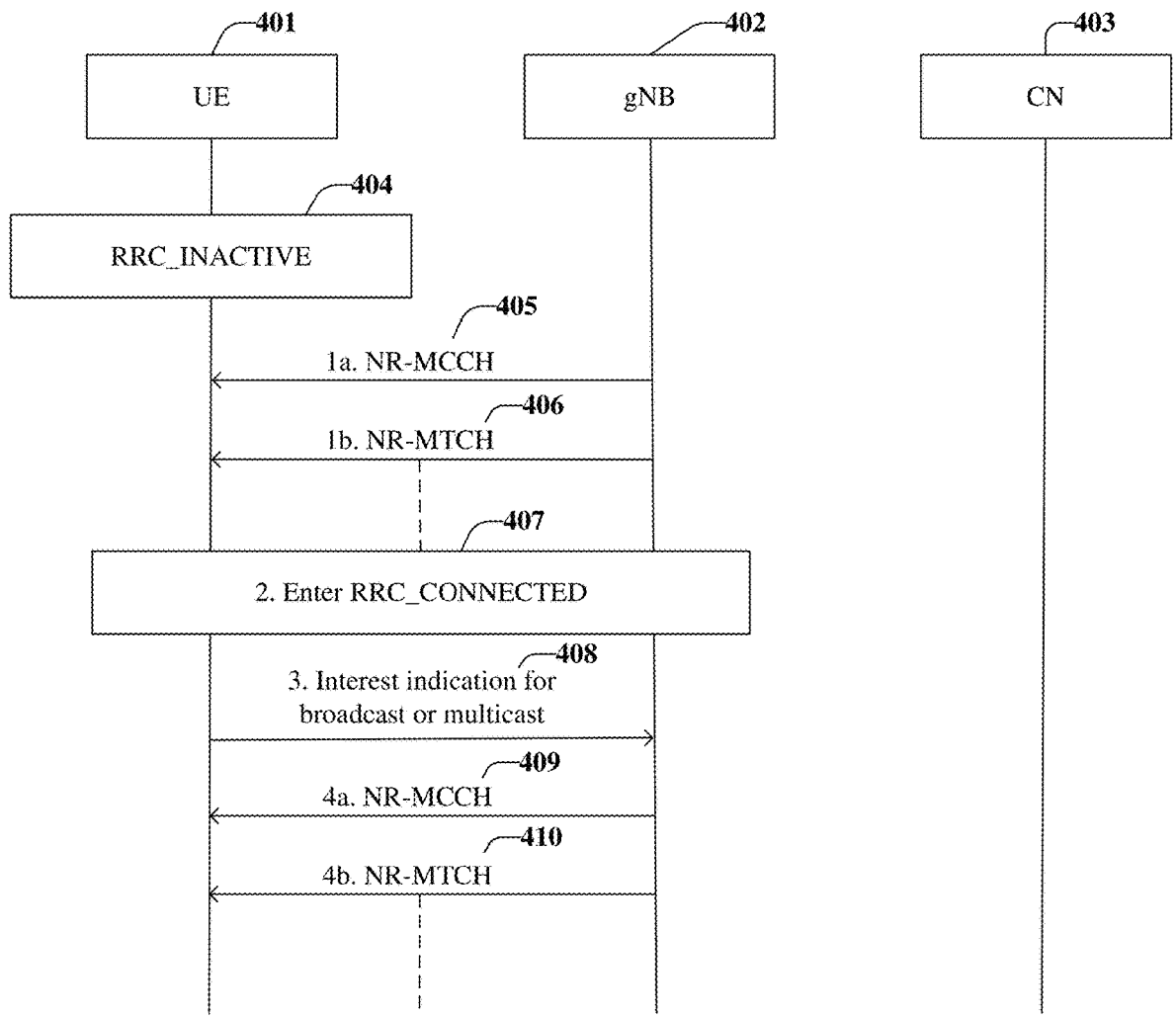
FIG. 4 illustrates an example, non-limiting flow diagram for continuing reception of a broadcast or multicast service of interest after a UE has entered an RRC_CONNECTED state from an RRC_INACTIVE state.

FIG. 4 illustrates an alternative example, non-limiting scenario of the interaction of between RRC states and the receipt of a broadcast or multicast service of interest. In contrast to FIG. 3, FIG. 4 illustrates a transition from an RRC_INACTIVE to an RRC_CONNECTED state. Again, no UE mobility is assumed, and CN 403 may contain a broadcast or multicast entity for the broadcast or multicast service of interest. At Step 404, UE 401 enters the RRC_INACTIVE state, and receives transmissions for a broadcast or multicast service of interest from gNB 402 over NR-MCCH 405 and NR-MTCH 406. While in the RRC_INACTIVE state, UE 401 initiates a connection establishment or connection resumption procedure, to establish or resume an RRC connection. UE 401 may initiate such procedures due to, e.g., uplink data arrival or paging reception. At Step 407, UE 401 enters the RRC_CONNECTED state. UE 401 thereafter and transmits an interest indication 408 for the broadcast or multicast service of interest to gNB 402, in order to guarantee reception of the broadcast or multicast service of interest. UE 401 then continues reception of the broadcast or multicast service of interest over NR-MCCH 409 and NR-MTCH 410.

In transitioning between RRC states, as illustrated in FIGS. 3 and 4, the UE may send an interest indication, e.g., MBMSInterestIndication or interest indication for broadcast or multicast, before suspending the RRC connection (in LTE) or entering the RRC_INACTIVE state (in NR). The UE may send the interest indication while in RRC_CONNECTED. It will be appreciated that the embodiments disclosed herein are applicable to suspension and resumption of RRC connections as to transitions between RRC states. As illustrated in FIG. 5, at Step 504, UE 501 enters the RRC_CONNECTED state, and establishes a connection with gNB 502. UE 501 thereafter transmits an interest indication 505 for a broadcast or multicast service of interest to gNB 502, with CN 503 containing a broadcast multicast entity for that service. UE 501 then may receive the broadcast or multicast service of interest. At Step 506, UE 501 enters the RRC_INACTIVE state, and in that state, continue reception of the broadcast or multicast service of interest. Subsequently, at Step 507, UE 501 enters the RRC_CONNECTED state, and resumes an RRC connection with gNB 502.

If the procedure set out in the LTE specification is adopted in NR, UE 501 then sends an interest indication 508 to gNB 502 upon re-entering the RRC_CONNECTED state (due to resuming an RRC connection or transition from RRC_INACTIVE state). Doing so may result in increased signaling overhead (and attendant power consumption), if the content of interest indication 508 is the same as interest indication 505. It is thus desirable for UE 501 to prevent unnecessary transmission of interest indications for broadcast or multicast to minimize signaling overhead after transmitting a first interest indication in a first serving cell by refraining from transmitting a second interest indication in a second serving cell if the content of the second interest indications is the same as the first interest indication. However, transmission of a second interest indication with content identical to a first interest indication may be needed if, e.g., a UE re-enters the RRC_CONNECTED state from a RRC_IDLE state, or the second serving cell requests transmission of an interest indication. Moreover, transmission of the second interest indication may be needed if the second serving cell differs from the first serving cell in, e.g., radio access network (RAN) paging area, RAN notification area, or radio access technology (RAT).

FIG. 6 illustrates an example, non-limiting enumeration of interest indications within the scope of this disclosure. For purposes of convenience, each interest indication type is designated from Type 1 to Type 5, but it will be appreciated that alternative nomenclatures and implementations may be within the scope of this disclosure. A Type 1 interest indication is initially transmitted by a UE to a first serving cell. After re-entry into the RRC_CONNECTED state in a second serving cell from the RRC_INACTIVE state, the UE may transmit a Type 2, Type 3, or Type 4 interest indication to the second serving cell. A Type 4 or Type 5 interest indication may be transmitted if their content is the same as the Type 1 interest indication, but a Type 2 interest indication will not be transmitted. Transmission of a Type 4 interest indication is performed upon request from the second serving cell, and a Type 4 interest indication will be transmitted if the second serving cell belongs to a different RAN paging area, RAN notification area, or RAT from the first serving cell. Finally, a Type 3 interest indication will be transmitted when the UE enters a second serving cell and transitions from RRC_IDLE to RRC_CONNECTED.

Figure 7:
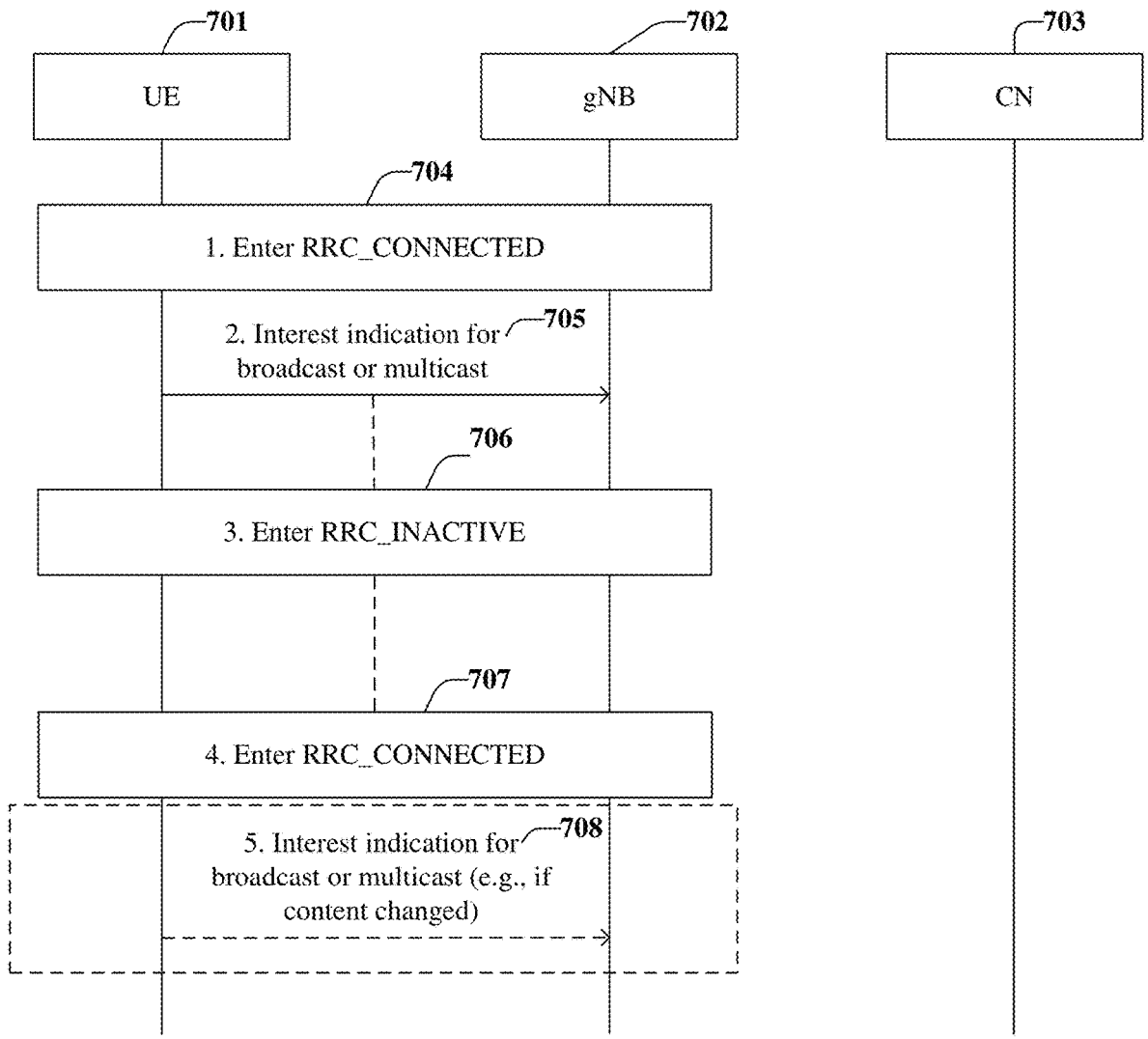
FIG. 7 illustrates an example, non-limiting flow diagram, in which a UE may or may not transmit an interest indication upon re-entering an RRC_CONNECTED state.

FIG. 7 illustrates an example, non-limiting scenario for handling interest indications in which a UE re-enters the RRC_CONNECTED state while receiving a broadcast or multicast service of interest. The same process illustrated in this figure may be applied for a UE resuming an RRC connection or entering RRC_CONNECTED from RRC_INACTIVE. At Step 704, UE 701 establishes a connection with gNB 702 while in a first serving cell. UE 701 then transmits an interest indication 705 for a broadcast or multicast service of interest to gNB 702, and initiate reception of the broadcast or multicast service of interest (through a broadcast or multicast entity resident on CN 703). At Step 706, UE 701 enters the RRC_INACTIVE state, while continuing reception of the broadcast or multicast service of interest. At Step 707, UE 701 enters the RRC_CONNECTED state, and resumes an RRC connection in a second serving cell. The first serving cell could be the same as the second serving cell. While gNB 702 communicates with both the first and second serving cells, it will be understand that alternative implementations may remain with the scope of this disclosure, e.g., the second serving cell communicates through another gNB. Whether to send an interest indication to the gNB may not be based on whether the UE sent an interest indication since last entering the RRC_CONNECTED state. If the content of the interest indication 708 is the same as the content of the interest indication 705, UE 701 will not transmit the interest indication 708 to gNB 702. Even if the set of frequencies associated with the broadcast or multicast service of interest is empty, e.g., if the content has changed, UE 701 will transmit the interest indication 708 to gNB 702. Unlike LTE, the determination of whether to send interest indication 708 does not depend on whether the UE has transmitted an interest indication since later entering the RRC_CONNECTED state.

Figure 8:
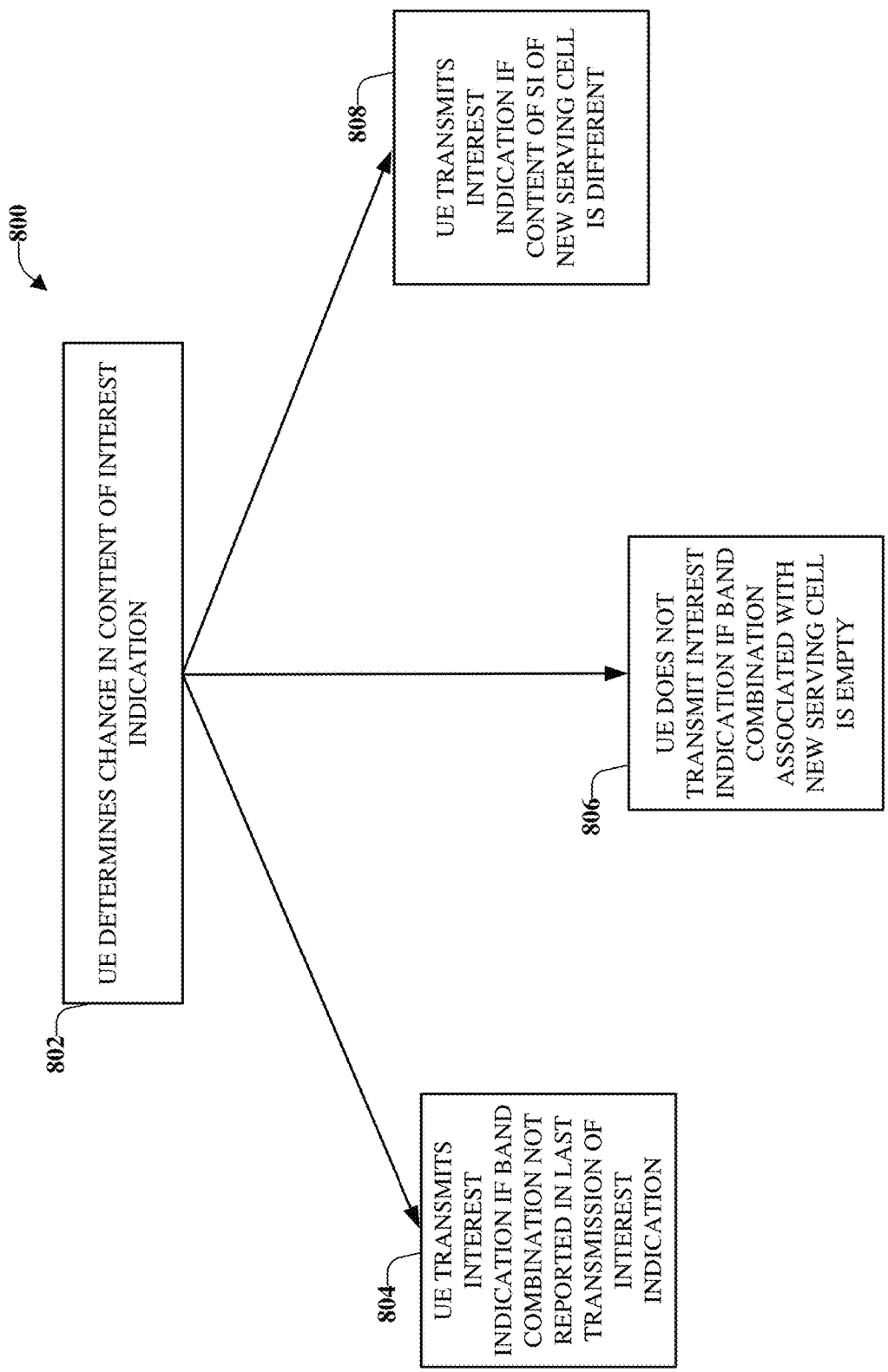
FIG. 8 illustrates an example, non-limiting methodology for transmitting an interest indication, in accordance with one or more embodiments described herein.

FIG. 8 illustrates an example, non-limiting methodology for determining whether to transmit interest indication 708 to gNB 702. In flow diagram 800, at step 802, the UE determines if there has been any change in the content of the interest indication. At Step 804, the UE transmits the interest indication if the band combination associated with the new serving cell was not reported in the UE's last transmission of an interest indication. At Step 806, the UE does not transmit the interest indication if the band combination associated with the new serving cell is empty. At Step 808, the UE transmits the interest indication if the content of the SI of the new serving cell is different. The difference in the SI may comprise services of interest supported in a cell, the broadcast or multicast area of a cell (e.g., MBSFN-AreaId, MBMS SAI, PLMN, CGI, ECGI, p-serviceArea), numerology of NR-MTCH and/or numerology of NR-MCCH associated with the broadcast or multicast service of interest. The UE may transmit the interest indication when the UE enters RRC_CONNECTED from RRC_INACTIVE.

The interest indication for a broadcast or multicast service of interest can indicate one or more of various types of information. For example, the interest indication may include the identities of services of interest (e.g., service ID, session ID, and/or TMGI), frequencies related to the services of interest, or broadcast or multicast areas related to the services of interest (e.g., MBSFN-AreaID, MBMS SAI, PLMN ID, CBI, ECGI, p-serviceArea, cell identity). The interest indication also may include priority between unicast service and broadcast or multicast service, an indication of whether the UE has valid system information for broadcast or multicast (e.g., for particular serving cell(s)), or whether the UE requires such system information. Further, the interest indication could include information relating to one or more measurement results of neighbor cells, UE capability (e.g., numerology, numerologies combination, band combinations, beam forming), or numerologies relating to the services of interest. The UE may set the content of the interest indication for broadcast or multicast, e.g., to be transmitted in a serving cell, without considering/requiring content of Other SI for broadcast or multicast, e.g., of the serving cell. For example, the UE may not have valid Other SI for broadcast or multicast, e.g., of the serving cell. If the UE does have valid Other SI for broadcast or multicast, e.g., of the serving cell, the UE may set the content of the interest indication to be transmitted in the serving cell based on the Other SI for broadcast or multicast.

Figure 9:
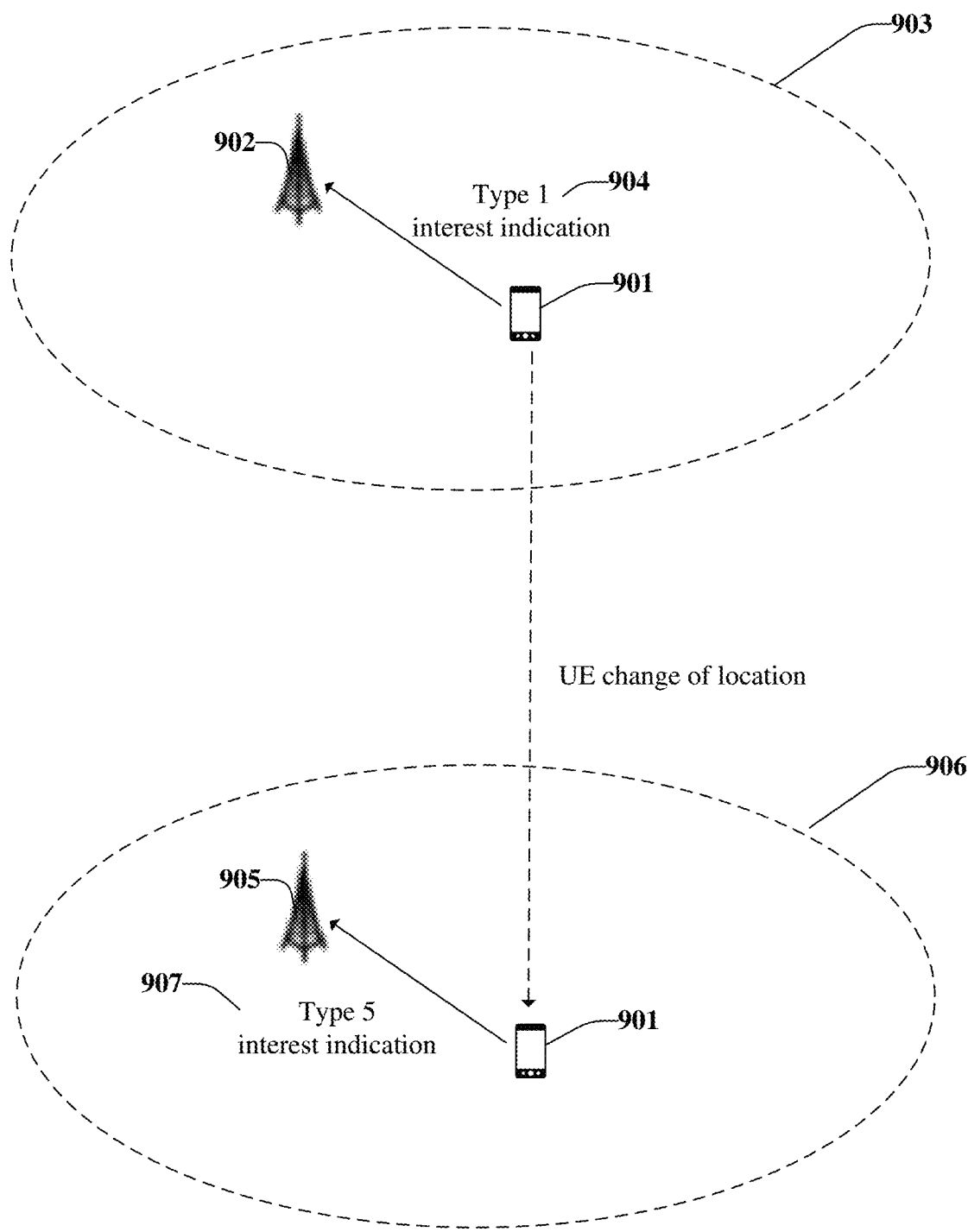
FIG. 9 illustrates an example, non-limiting wireless communication system, in which a UE transmits an interest indication in a second serving cell that differs from a first serving cell in radio access network (RAN) paging area, RAN notification area, or radio access technology (RAT), in accordance with one or more embodiments described herein.

The UE may determine whether to send an interest indication based on whether the location of the UE has changed since its last transmission of an interest indication, e.g., the last transmission occurred when the UE was last in the RRC_CONNECTED state. The UE could send the interest indication when the UE resumes an RRC connection or enters RRC_CONNECTED from RRC_INACTIVE. As illustrated in FIG. 9, with reference to FIG. 6, UE 901 transmits a Type 1 interest indication 904 to network node 902 in a first serving cell 903, and subsequently changes location. It will be understood that a change in location could mean a change of serving cell, RAN notification area (e.g., UE in the RRC_INACTIVE state that moves or performs mobility within the area without notifying the network), and/or RAT of the UE. When the UE 901 changes location, it then transmits a Type 5 interest indication 907 to network node 905 in a second serving cell 906 upon re-entering the RRC_CONNECTED state. It will be appreciated that UE 901 will transmit the Type 5 interest indication 907, even if the content of the interest indication is the same as the Type 1 interest indication 904 that was transmitted previously. UE 901 may transmit interest indication 907 before entering an RRC_INACTIVE state.

Figure 10:
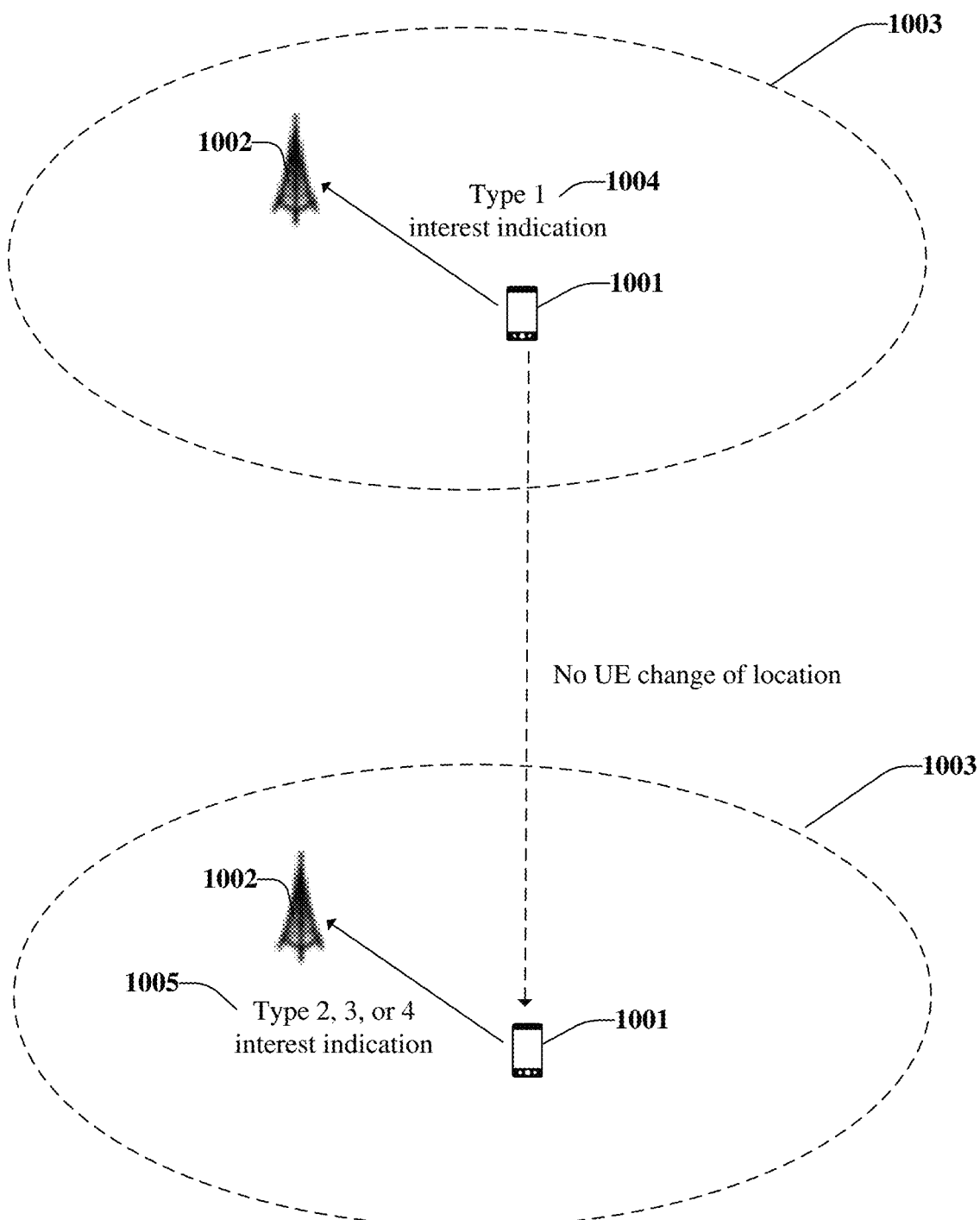
FIG. 10 illustrates an example, non-limiting alternate wireless communication system, in which a UE transmits an interest indication in a second serving cell that is identical to a first serving cell in RAN paging area, RAN notification area, or RAT, in accordance with one or more embodiments described herein.

Alternatively, FIG. 10, with reference to FIG. 6, illustrates an example, non-limiting scenario in which the UE has not changed locations, i.e., not changed serving cell, RAN paging area, RAN notification area, and/or RAT of the UE. UE 1001 initially sends a Type 1 interest indication 1004 to network node 1002 in serving cell 1003, and enters an RRC_INACTIVE or RRC_IDLE state. Upon re-entering the RRC_CONNECTED state, UE 1001 remains in communication with network node 1002 in serving cell 1003, and the sends an interest indication 1005, which can be Type 2, Type 3, or Type 4. As noted above and in FIG. 6, a Type 2 interest indication will not be transmitted if its content is the same as Type 1 interest indication 1004.

UE 1001 may transmit a Type 4 interest indication if it receives an request in serving cell 1003 for the transmission of an interest indication. UE 1001 may transmit an interest indication 1005 if it receives an request in serving cell 1003 for the transmission of the interest indication. The UE may transmit the interest indication 1005 when the UE enters RRC_CONNECTED from RRC_INACTIVE. The request could be contained in a message transmitted during connection establishment, e.g., in LTE, RRCConnectionResume or RRCConnectionSetup. The request may also be contained in SI for a broadcast or multicast service of interest, indicating whether the network requires UE 1001 to transmit the interest indication. The indication could also be contained in an RRC message. Preferably, if UE 1001 receives a request for transmission of an interest indication from network node 1002 in serving cell 1003, UE 1001 may enter the RRC_CONNECTED state and transmit the interest indication 1005 to the network node 1002, regardless of its RRC state. As in FIG. 9, UE 1001 may send interest indication 1005 before entering an RRC_INACTIVE state.

The network (e.g., eNodeB, gNodeB, or core network node) may need to store the content of an interest indication received from an UE, and UE configuration, when the UE leaves the RRC_CONNECTED state. For example, the UE may have suspended its RRC connection, entered an RRC_IDLE state, or entered an RRC_INACTIVE state. The UE may also need to store the content of the last-transmitted interest indication when it leaves the RRC_CONNECTED state. The network may provide to a new serving cell (or gNodeB) the content of the stored interest indication, along with information related to the UE, e.g., UE context, when the UE tends to transition to the RRC_CONNECTED state from the RRC_INACTIVE state, and stored UE context (i.e., information related to the UE) if the UE changes location (i.e. the UE moves to coverage of the new serving cell or the new gNodeB). The entity providing the content of the stored interest indication and information related to the UE may be the gNodeB that served the UE prior to the UE entering an RRC_INACTIVE state, or a network node in the core network, e.g., Mobility Management Entity (MME) in LTE.

The techniques discussed above may be implemented in an LTE system as well as in 5G NR. Section 5.8.5.2 of 3GPP TS 36.331 v.14.0.0, quoted below in part, may be modified, as shown in bolded underline:

"1>if SystemInformationBlockType15 is broadcast by the PCell:
  2>ensure having a valid version of SystemInformationBlockType15 for the PCell;
  2>if the UE did not transmit an MBMSInterestIndication message since last entering RRC_CONNECTED state and the UE did not transmit any MBMSInterestIndication message before; or
  2>if since the last time the UE transmitted an MBMSInterestIndication message, the UE connected to a PCell not broadcasting SystemInformationBlockType15 or the UE connected to a PCell associated with different TrackinkAreaCode:
    3>if the set of MBMS frequencies of interest, determined in accordance with 5.8.5.3, is not empty:
      4>initiate transmission of the MBMSInterestIndication message in accordance with 5.8.5.4;
  2>else:
    3>if the set of MBMS frequencies of interest, determined in accordance with 5.8.5.3, has changed since the last transmission of the MBMSInterestIndication message; or
    3>if the prioritisation of reception of all indicated MBMS frequencies compared to reception of any of the established unicast bearers has changed since the last transmission of the MBMSInterestIndication message:
      4>initiate transmission of the MBMSInterestIndication message in accordance with 5.8.5.4;"

Similarly, section 5.3.12 of 3GPP TS 36.331 v.14.0.0 may be modified, as shown in bolded underline below:

"Upon leaving RRC_CONNECTED, the UE shall:
1>reset MAC;
1>stop all timers that are running except T320, T325 and T330;
1>if leaving RRC_CONNECTED was triggered by suspension of the RRC:
  2>re-establish RLC entities for all SRBs and DRBs;
  2>store the UE AS Context including the current RRC configuration, the current security context, the PDCP state including ROHC state, C-RNTI used in the source PCell, the cellIdentity and the physical cell identity of the source PCell;
  2>store the content of last transmission of the MBMSInterestIndication message;
  2>store the following information provided by E-UTRAN:
    3>the resumeIdentity;
  2>suspend all SRB(s) and DRB(s);
  2>indicate the suspension of the RRC connection to upper layers;"

Figure 11:
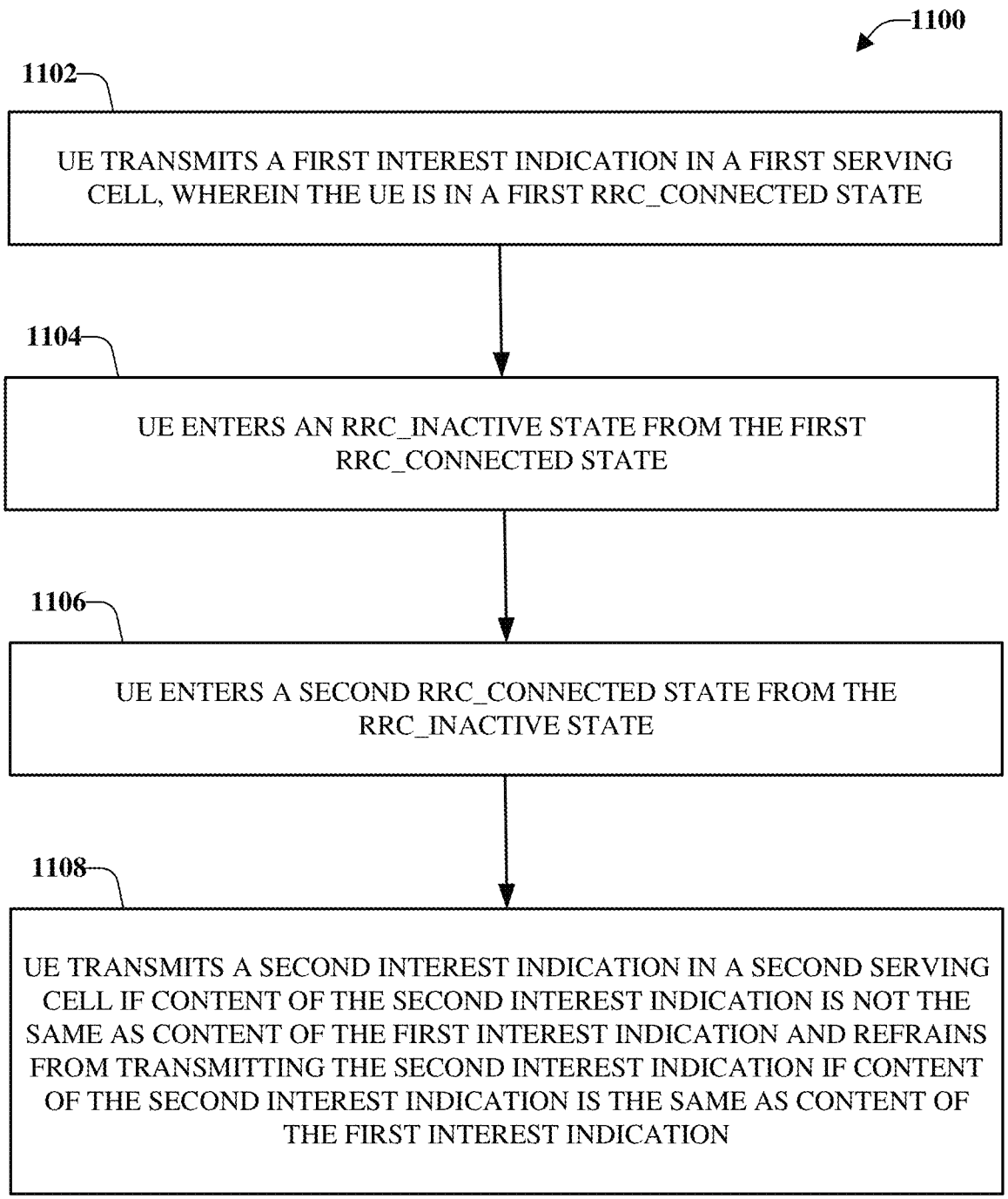
FIG. 11 illustrates an example, non-limiting methodology for transmitting an interest indication to a serving cell after a UE enters an RRC_CONNECTED state from an RRC_INACTIVE state, in accordance with one or more embodiments described herein.

FIG. 11 illustrates an example, non-limiting methodology for a UE for transmitting an interest indication in a serving cell. As illustrated in flow diagram 1100, at Step 1102, a UE transmits a first interest indication in a first serving cell, wherein the UE is in a first RRC_CONNECTED states. At Step 1104, the UE enters an RRC_INACTIVE state from the first RRC_CONNECTED state. At Step 1106, the UE enters a second RRC_CONNECTED state from the RRC_INACTIVE state. Finally, at Step 1108, the UE transmits a second interest indication in a second serving cell if content of the second interest indication is not the same as content of the first interest indication, and refrains from transmitting the second interest indication if content of the second interest indication is the same as content of the first indication.

In one method, the first interest indication or second interest indication indicates one or multiple identities of broadcast or multicast service(s) the UE is interested in.

Figure 12:
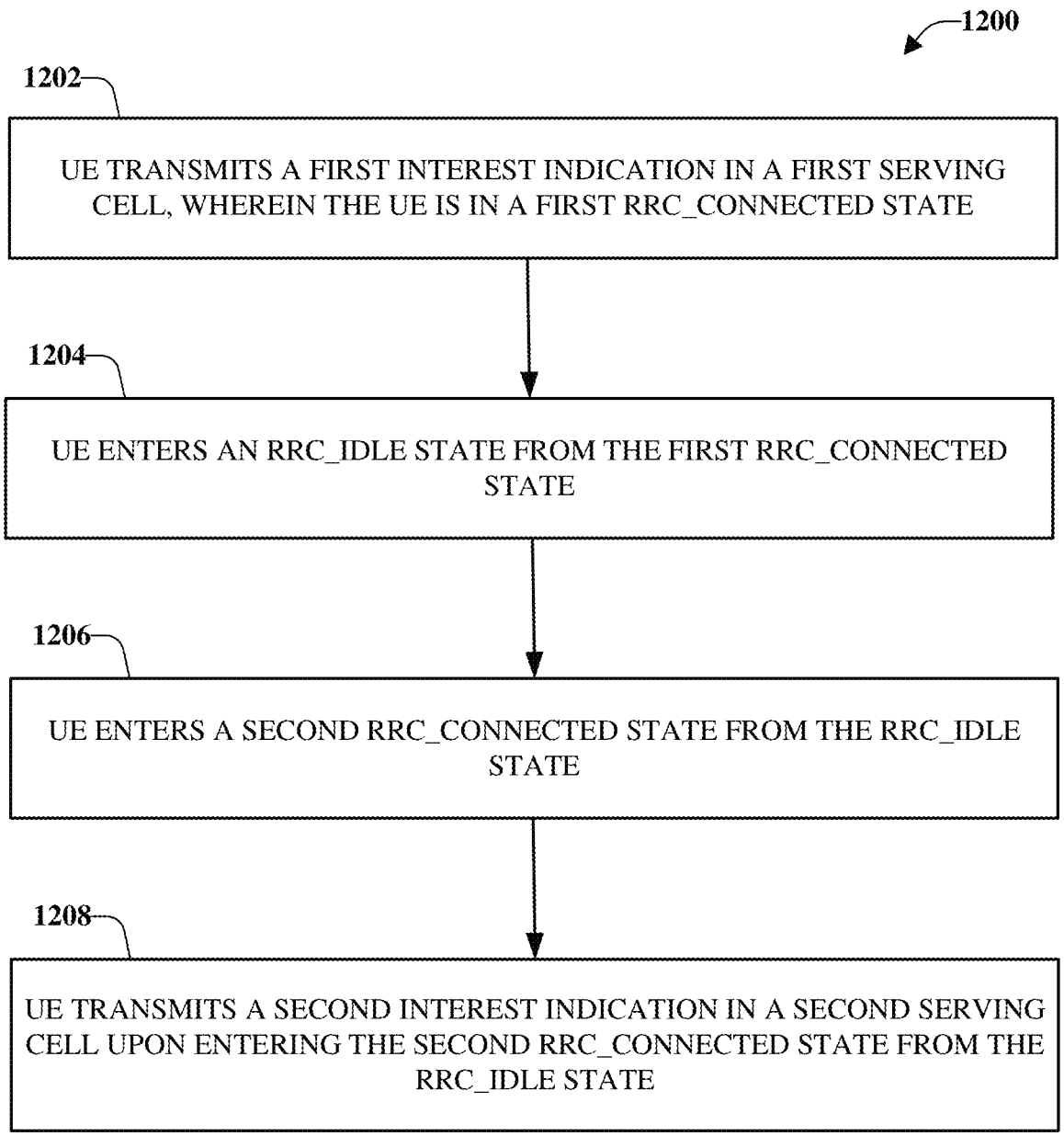
FIG. 12 illustrates an example, non-limiting methodology for transmitting an interest indication to a serving cell after a UE enters a RRC_CONNECTED state from an RRC_IDLE state, in accordance with one or more embodiments described herein.

FIG. 12 illustrates an example, non-limiting methodology for a UE for transmitting an interest indication after entering an RRC_CONNECTED state from RRC_IDLE. At Step 1202 of flow diagram 1200, a UE transmits a first interest indication in a first serving cell, wherein the UE is in a first RRC_CONNECTED state. At Step 1204, the UE enters an RRC_IDLE state from the first RRC_CONNECTED state. At Step 1206, the UE enters a second RRC_CONNECTED state from the RRC_IDLE state. At Step 1208, the UE transmits a second interest indication in a second serving cell upon entering the second RRC_CONNECTED state from the RRC_IDLE state.

Figure 13:
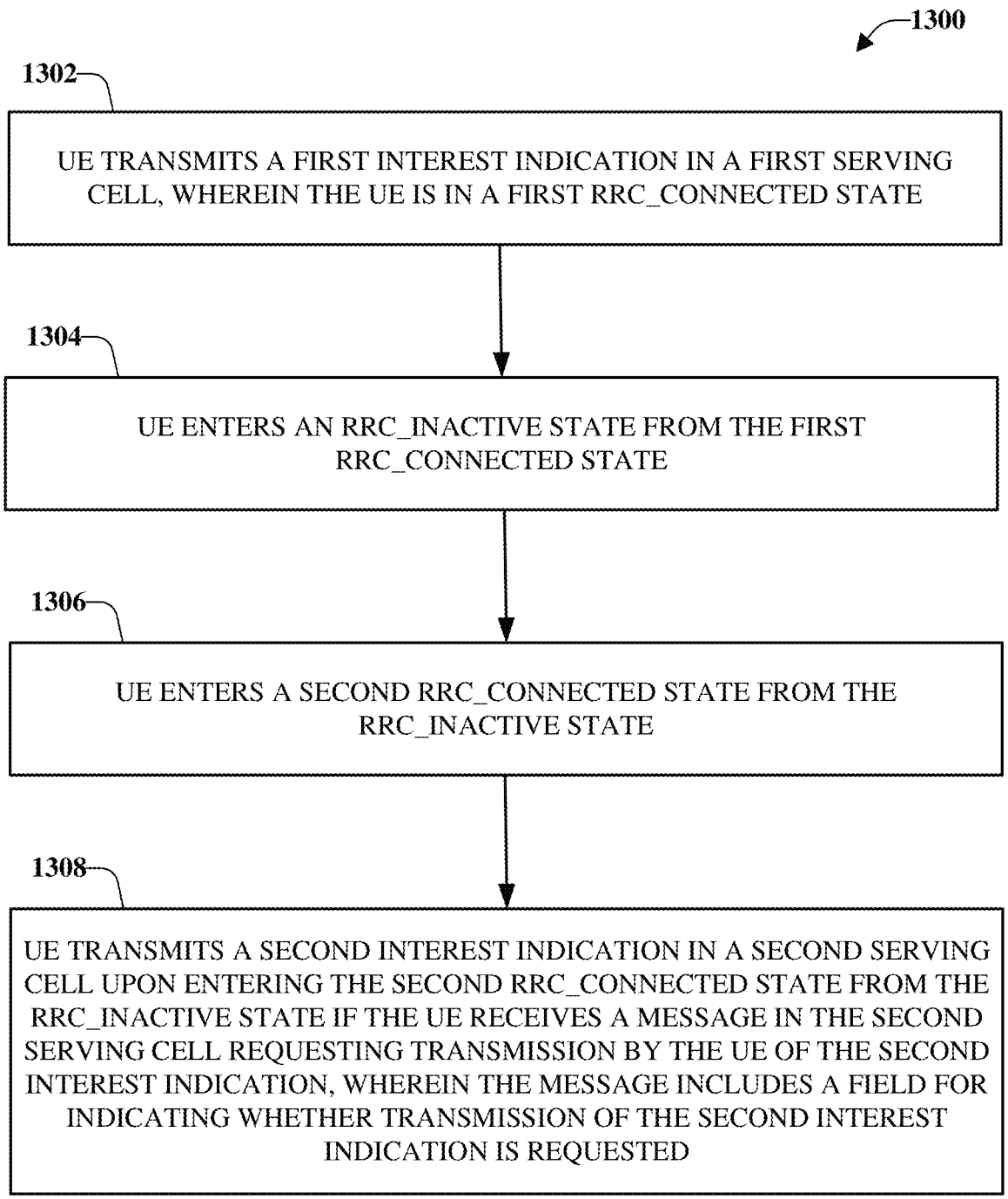
FIG. 13 illustrates an example, non-limiting methodology for transmitting an interest indication to a serving cell after receiving a message from the serving cell requesting transmission of the interest indication, in accordance with one or more embodiments described herein.

FIG. 13 illustrates an example, non-limiting methodology for a UE for transmitting an interest indication upon request from a serving cell. In flow diagram 1300, at Step 1302, a UE transmits a first interest indication in a first serving cell, wherein the UE is in a first RRC_CONNECTED state. At Step 1304, the UE enters an RRC_INACTIVE state from the first RRC_CONNECTED state. At Step 1306, the UE enters a second RRC_CONNECTED state from the RRC_INACTIVE state. Finally, at Step 1308, the UE transmits a second interest indication in a second serving cell upon entering the second RRC_CONNECTED state from the RRC_INACTIVE state if the UE receives a message in the second serving cell request transmission by the UE of the second interest indication, wherein the message includes a field for indicating whether transmission of the second interest indication is requested.

Figure 14:
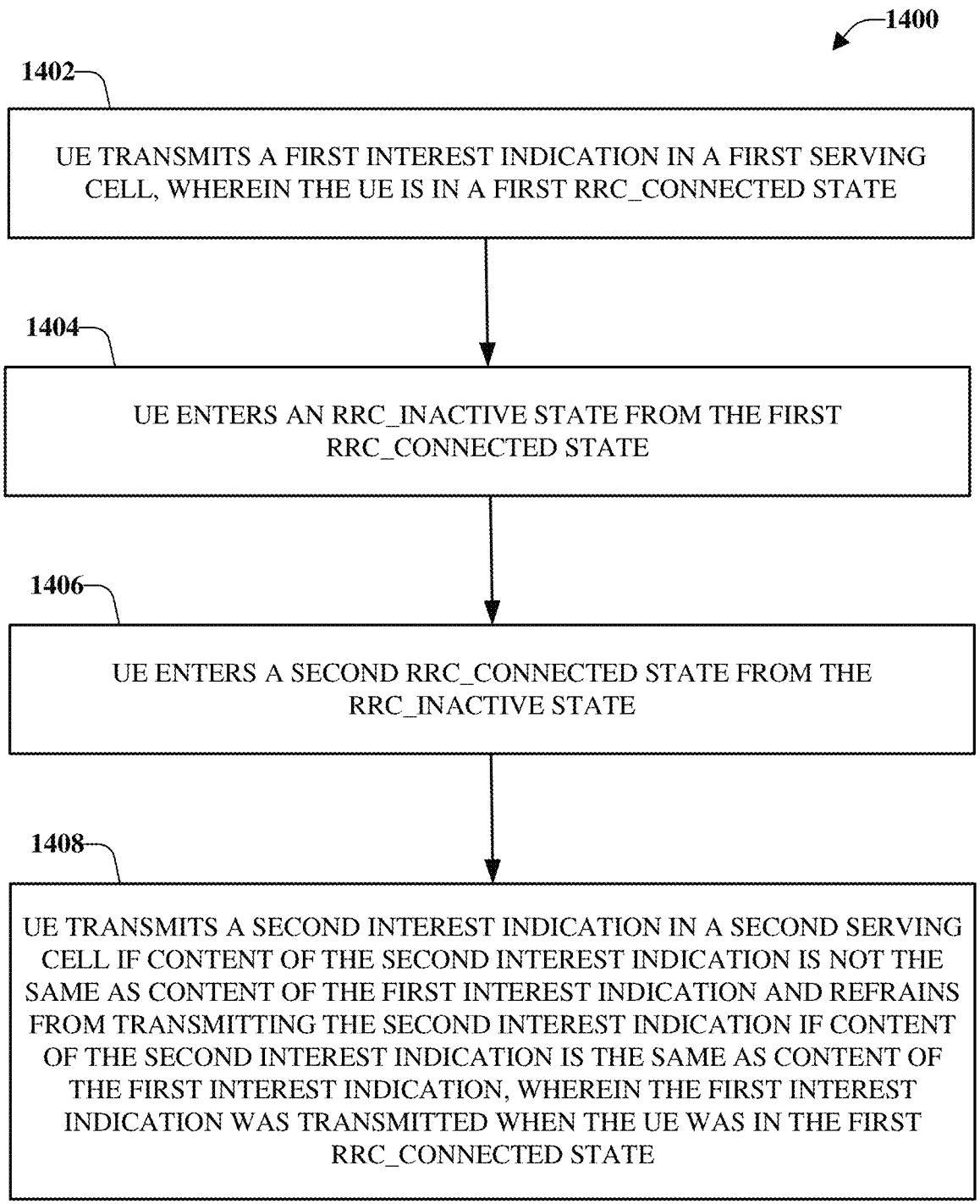
FIG. 14 illustrates an example, non-limiting methodology for transmitting an interest indication to a serving cell, in which a UE refrains from sending an interest indication if its content is the same as an interest indication that the UE sent previously, in accordance with one or more embodiments described herein.

FIG. 14 illustrates an example, non-limiting methodology for a UE for transmitting an interest indication in a serving cell upon re-entering the RRC_CONNECTED state. In flow diagram 1400, at Step 1402, a UE transmits a first interest indication in a first serving cell, wherein the UE is in a first RRC_CONNECTED state. At Step 1404, the UE enters an RRC_INACTIVE state from the first RRC_CONNECTED state. At Step 1406, the UE enters a second RRC_CONNECTED state from the RRC_INACTIVE state. Finally, at Step 1408, the UE transmits a second interest indication in a second serving cell if content of the second interest indication is not the same as content of the first interest indication and refrains from transmitting the second interest indication if content of the second interest indication is the same as content of the first interest indication, wherein the first interest indication was transmitted when the UE was in the first RRC_CONNECTED state.

One embodiment of this disclosure is a method for a UE, comprising transmitting a first interest indication in a first serving cell by the UE, wherein the UE is in a first RRC_CONNECTED state, entering an RRC_INACTIVE state from the first RRC_CONNECTED state, entering a second RRC_CONNECTED state from the RRC_INACTIVE state, and transmitting a second interest indication in a second serving cell upon entering the second RRC_CONNECTED state from the RRC_INACTIVE state if content of the second interest indication is not the same as content of the first interest indication and not transmitting the second interest indication in the second serving cell upon entering the second RRC_CONNECTED state from the RRC_INACTIVE state if content of the second interest indication is the same as content of the first interest indication. As another embodiment, the UE retains information included in the first interest indication after the UE enters the RRC_INACTIVE state. In a further embodiment, the first serving cell and the second serving cell differ in one or more radio access network (RAN) paging areas, RAN notification areas, or radio access technologies. In another embodiment, the first serving cell and the second serving cell utilize identical one or more RAN paging areas, RAN notification areas, or radio access technologies or cells. In another embodiment, each of the first interest indication and the second interest indication comprises an interest indication for a broadcast or multicast service of interest. In a further embodiment, the UE does not transmit an interest indication in a time period after transmission of the first interest indication and before transmission of the second interest indication.

In another embodiment, a method for a UE comprises transmitting a first interest indication in a first serving cell by the UE, wherein the UE is in RRC_CONNECTED, entering RRC_INACTIVE from RRC_CONNECTED, and entering RRC_CONNECTED from RRC_INACTIVE and transmitting a second interest indication in a second serving cell if content of the second interest indication is not the same as content of the first interest indication and not transmitting the second interest indication in the second serving cell if content of the second interest indication is the same as content of the first interest indication, wherein the first interest indication was transmitted the last time when the UE was in RRC_CONNECTED. In another embodiment, the UE keeps or retains information carried by or included in the first interest indication when the UE enters the RRC_INACTIVE state from the first RRC_CONNECTED state. In a further embodiment, the UE transmits the second interest indication regardless of whether a set of multicast frequencies of interest to be carried by the second interest indication is empty or not. In an additional embodiment, the UE does not transmit any interest indication between the first interest indication and the second interest indication.

One embodiment further comprises the UE entering a third RRC_CONNECTED state from an RRC_IDLE state and transmitting a third interest indication in the second serving cell even if content of the third interest indication is the same as the content of the first interest indication. Another embodiment further comprises entering RRC_CONNECTED from RRC_IDLE and transmitting a third interest indication in the second serving cell even if content of the third interest indication is the same as content of the first interest indication.

An embodiment of this disclosure further comprises the UE not transmitting the third interest indication if a set of multicast frequencies of interest to be carried by the third interest indication is empty. In another embodiment, the UE does not transmit any interest indication between the first interest indication and the third interest indication. In further embodiments, the first serving cell and the second serving cell are the same cell, belong to the same RAN paging area or the same RAN notification area, and/or use the same RAT.

One embodiment further comprises the UE transmitting a fourth interest indication for broadcast or multicast in the second serving cell upon entering RRC_CONNECTED from RRC_INACTIVE regardless of whether content of the fourth interest indication is the same as content of the first interest indication, if the UE receives a message in the second serving cell for requesting transmission of the fourth interest indication, wherein the message includes an indication for indication whether transmission of the fourth interest indication is requested. As an alternative embodiment, the UE enters RRC_CONNECTED from RRC_INACTIVE and transmits a fourth interest indication for broadcast or multicast in the second serving cell regardless of whether content of the fourth interest indication is the same as content of the first interest indication, if the UE receives a message in the second serving cell for requesting transmission of the fourth interest indication, wherein the message includes an indication for indicating whether transmission of the fourth interest indication is requested.

In one embodiment, the message could be a connection setup message. In another embodiment, the message could be SI for broadcast or multicast. In a further embodiment, the UE does not transmit any interest indication between the first interest indication and the fourth interest indication.

One embodiment of this disclosure further comprises entering a fourth RRC_CONNECTED state from the RRC_INACTIVE state and transmitting a fifth interest indication for broadcast or multicast in a third serving cell even if content of the fifth interest indication is the same as content of the first interest indication, wherein the first serving cell and the third serving cell belong to different RAN paging areas, belong to different RAN notification areas, or use different RATs. An alternative embodiment further comprises entering RRC_CONNECTED from RRC_INACTIVE and transmitting a fourth interest indication for broadcast or multicast in a third serving cell even if content of the fourth interest indication is the same as content of the first interest indication, wherein the first serving cell and the third serving cell belong to different RAN paging areas, belong to different RAN notification areas, or use different RATs. In a further embodiment, the UE does not transmit any interest indication between the first interest indication and the fifth interest indication.

In one embodiment, the first interest indication is not empty. In another embodiment, the first, second, third, fourth, and/or fifth interest indications are interest indications for broadcast or multicast. In further embodiments, the UE is receiving the broadcast or multicast service in RRC_INACTIVE or in RRC_CONNECTED. In an additional embodiment, the UE continues to receive the broadcast or multicast service from the transmission of the first indication.

One embodiment of this disclosure is a method for a first network node, comprising receiving information, carried by or included in an interest indication, related to a UE in a first RRC_CONNECTED state, and keeping or retaining the information when the UE enters an RRC_INACTIVE state from the first RRC_CONNECTED state. Another embodiment further comprises the first network node applying the information when the UE enters a second RRC_CONNECTED state from the RRC_INACTIVE state. A further embodiment further comprises the first network node transmitting the information to a second network node if the first network node receives a query for the information from the second network node. The interest indication indicates one or multiple identities of broadcast or multicast service(s) the UE is interested in.

One embodiment is a method for a second network node, comprising acquiring information, carried by an interest indication, associated with a UE when the UE tends to enter RRC_CONNECTED from RRC_INACTIVE, wherein the information is acquired from a first network node, and applying the information when the UE enters RRC_CONNECTED from RRC_INACTIVE. Another embodiment is a method for a first network node, comprising receiving an interest indication from a UE in RRC_CONNECTED, and transmitting information carried by the interest indication to a third network node when the UE enters RRC_INACTIVE from RRC_CONNECTED. The information may be a UE context. In a further embodiment, the first network node is a gNB. In other embodiments, the second network node is a MME or a gNB. In another embodiment, the third network node is a MME.

In one embodiment, the third network node is a network entity used to keep UE information (e.g., UE context, broadcast or multicast service related information). In an alternative embodiment, the third network node is a network entity used to control broadcast or multicast service. In a further embodiment, the interest indication is an interest indication for broadcast or multicast.

In another embodiment, a communication device comprises a control circuit, a processor installed in the controlled circuit, and a memory installed in the control circuit and operatively coupled to the processor, wherein the processor is configured to execute a program code stored in the memory to perform any of the methods disclosed herein.

One embodiment of this disclosure is a method for a UE, comprising transmitting first interest indication in a first serving cell by the UE, wherein the UE is in a first RRC_CONNECTED state, entering an RRC_IDLE state from the first RRC_CONNECTED state, entering a second RRC_CONNECTED state from the RRC_IDLE state, and transmitting a second interest indication in a second serving cell upon entering the second RRC_CONNECTED state from the RRC_IDLE state. In another embodiment, the UE retains information included in the first interest indication after the UE enters the RRC_IDLE state. As a further embodiment, the first serving cell and the second serving cell differ in one or more RAN paging areas, RAN notification areas, or radio access technologies. In another embodiment, the first serving cell and the second serving cell utilize identical one or more RAN paging areas, RAN notification areas, or radio access technologies. In another embodiment, the UE does not transmit the second interest indication if the second interest indication does not include a set of multicast frequencies of interest. In a further embodiment, each of the first interest indication and the second interest indication comprises an interest indication for a broadcast or multicast service of interest. In another embodiment, the UE does not transmit an interest indication in a time period after transmission of the first interest indication and before transmission of the second interest indication.

One embodiment of this disclosure is a method for a UE, comprising transmitting a first interest indication in a first serving cell by the UE, wherein the UE is in a first RRC_CONNECTED state, entering an RRC_INACTIVE state from the first RRC_CONNECTED state, entering a second RRC_CONNECTED state from the RRC_INACTIVE state, and transmitting a second interest indication in a second serving cell upon entering the second RRC_CONNECTED state from the RRC_INACTIVE state if the UE receives a message in the second serving cell requesting transmission by the UE of the second interest indication, wherein the message includes a field for indicating whether transmission of the second interest indication is requested. In another embodiment, the UE retains information included in the first interest indication after the UE enters the RRC_INACTIVE state. As a further embodiment, the first serving cell and the second serving cell differ in one or more of RAN paging areas, RAN notification areas, or radio access technologies. In another embodiment, the first serving cell and the second serving cell utilize identical one or more RAN paging areas, RAN notification areas, or radio access technologies. In another embodiment, the message is one of a connection setup message or a system information for broadcast or multicast. In another embodiment, each of the first interest indication and the second interest indication comprises an interest indication for a broadcast or multicast service of interest. As a further embodiment, the UE does not transmit an interest indication in a time period after transmission of the first interest indication and before transmission of the second interest indication.

Figure 15:
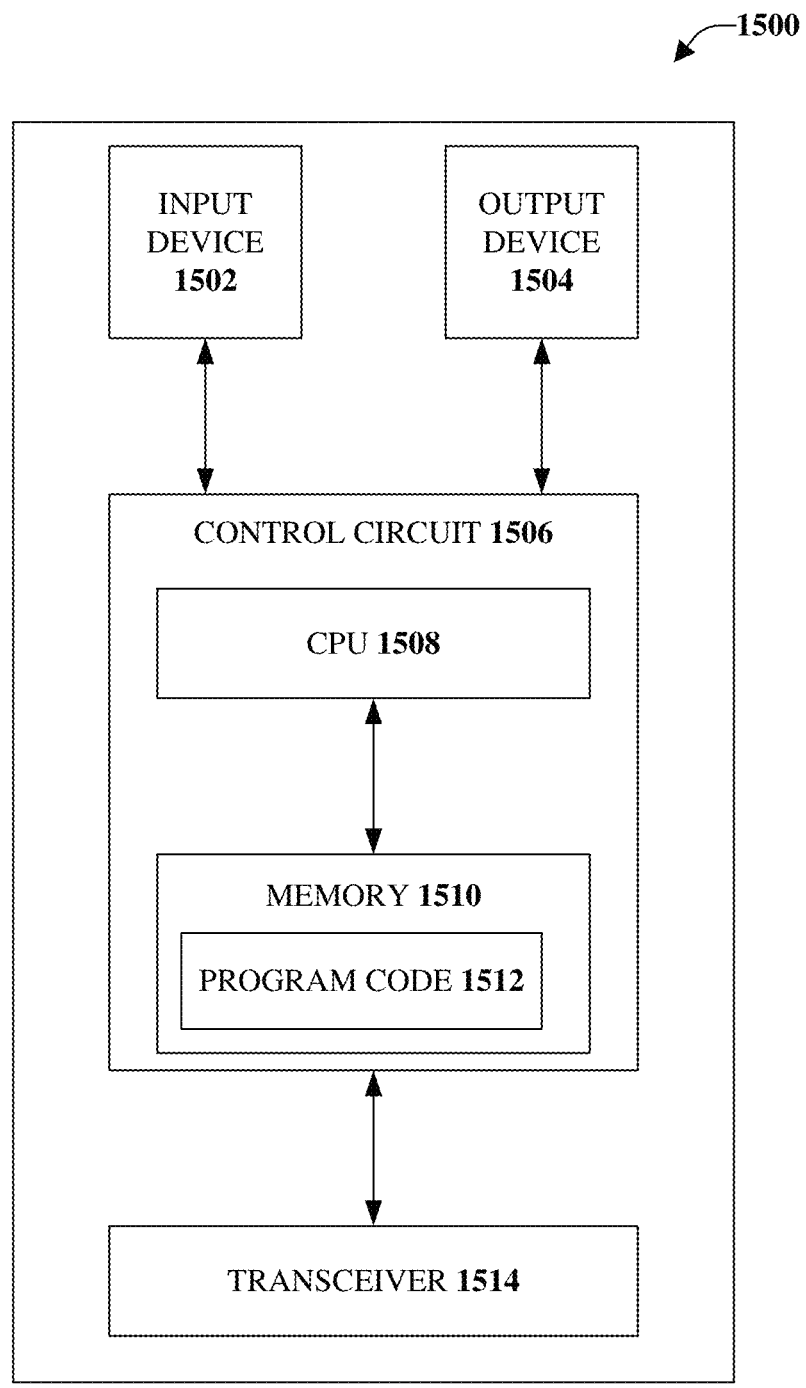
FIG. 15 illustrates a simplified block diagram of a communication device, in accordance with one or more embodiments described herein.

Turning to FIG. 15, illustrated is an alternative simplified functional block diagram of a communication device 1500 in accordance with one or more embodiments described herein. The communication device 1500 in a wireless communication system can be utilized for realizing the mobile devices (or UEs) 114 and 120 in FIG. 1, and the wireless communications system can be a 5G system. The communication device 1500 can include an input device 1502, an output device 1504, a control circuit 1506, a central processing unit (CPU) 1508, a memory 1510, a program code 1512, and a transceiver 1514. The control circuit 1506 executes the program code 1512 in the memory 1510 through the CPU 1508, thereby controlling an operation of the communication device 1500. The program code can be executed to perform the techniques illustrated in FIGS. 2-14. The communication device 1500 can receive signals input by a user through the input device 1502, such as a keyboard or keypad, and can output images and sounds through the output device 1504, such as a monitor or speakers. The transceiver 1514 is used to receive and transmit wireless signals, delivering received signals to the control circuit 1506, and outputting signals generated by the control circuit 1506 wirelessly.

Figure 16:
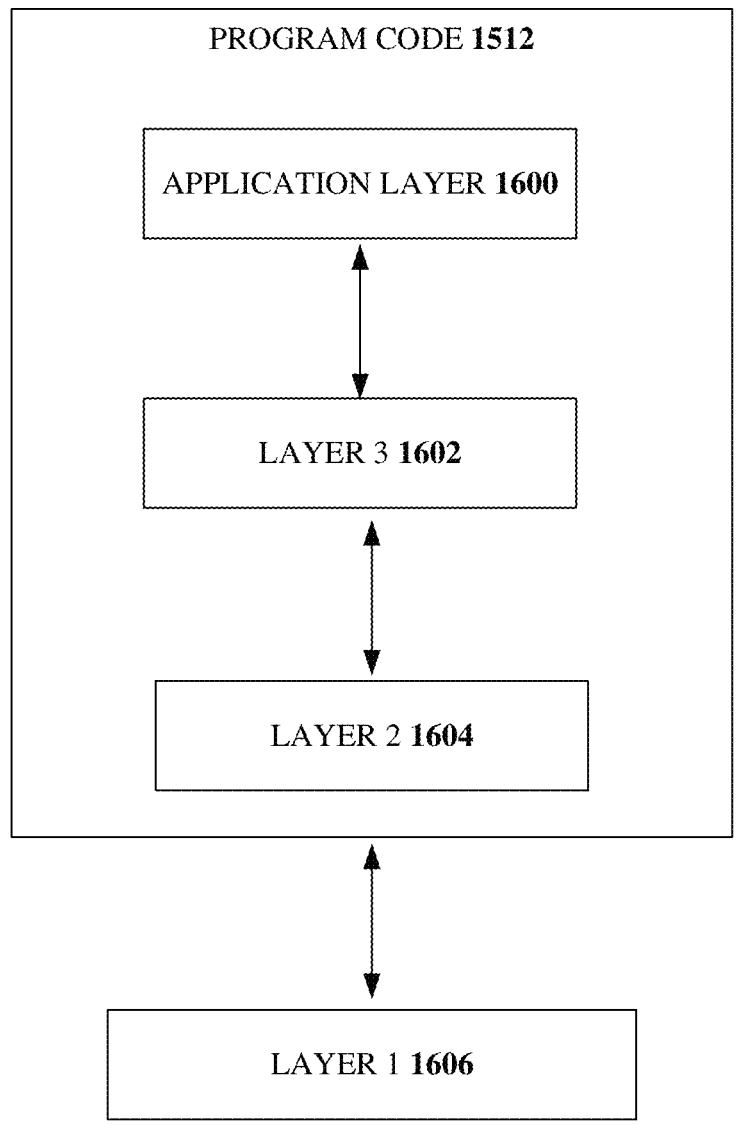
FIG. 16 illustrates a simplified block diagram of the program code shown in FIG. 15, in accordance with one or more embodiments described herein.

FIG. 16 is a simplified block diagram of the program code 1512 shown in FIG. 15, in accordance with one or more embodiments described herein. In this embodiment, the program code 1512 includes an application layer 1600, a Layer 3 portion 1602, and a Layer 2 portion 1604, and is coupled to a Layer 1 portion 1606. The Layer 3 portion 1602 generally performs radio resource control. The Layer 2 portion 1604 generally performs link control. The Layer 1 portion 1606 generally performs physical connections. For a 5G system, the Layer 2 portion 1604 may include a Radio Link Control (RLC) layer and a Medium Access Control (MAC) layer. The Layer 3 portion 1602 may include a Radio Resource Control (RRC) layer.

Figure 17:
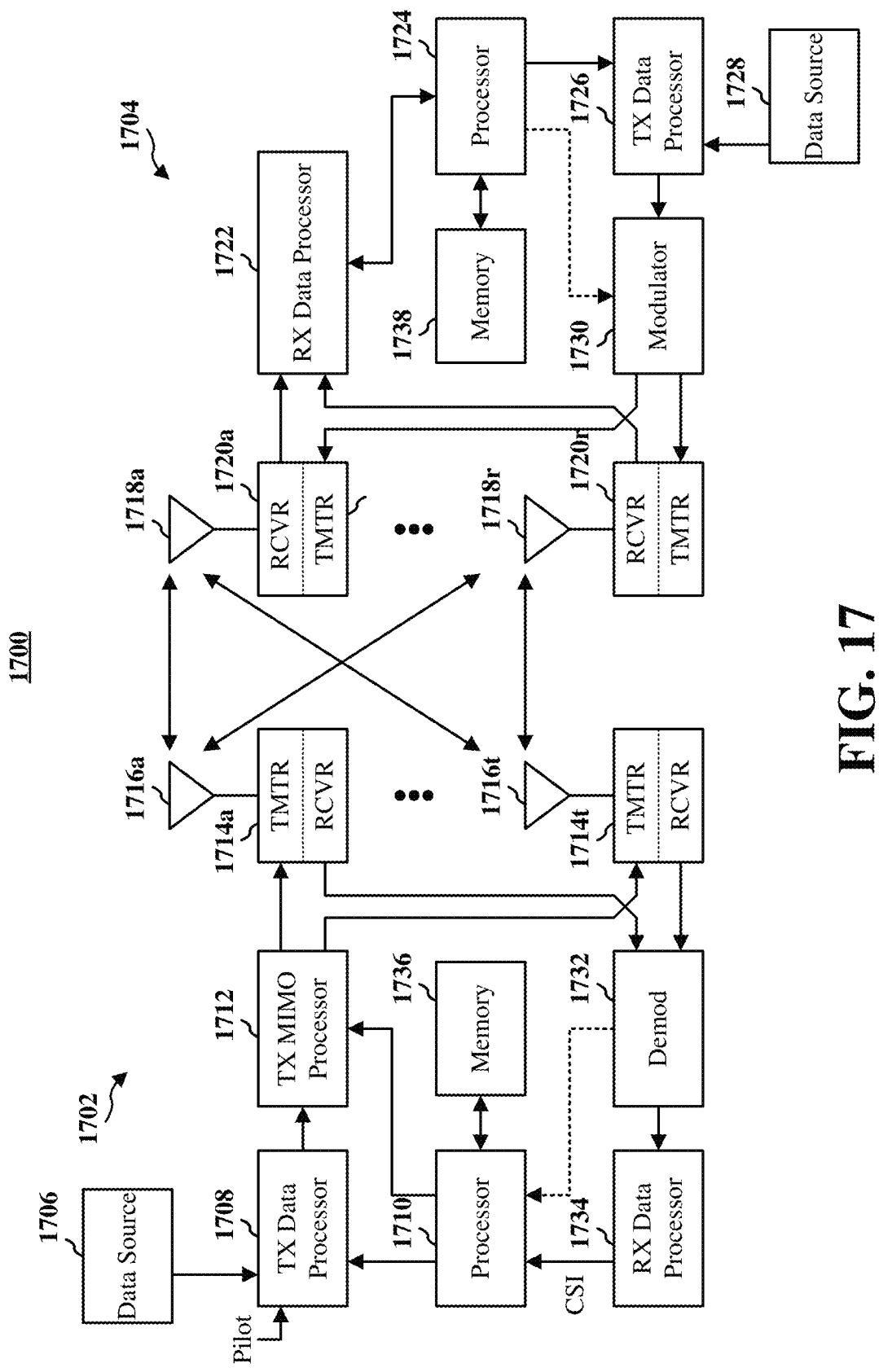
FIG. 17 illustrates a simplified block diagram of an embodiment of a wireless communications system that includes a transmitter system and a receiver system, in accordance with one or more embodiments described herein.

FIG. 17 illustrates a simplified block diagram of an embodiment a MIMO system 1700 that includes of a transmitter system 1702 (also known as the access network) and a receiver system 1704 (also known as user equipment (UE)) in accordance with one or more embodiments described herein. At the transmitter system 1702, traffic data for a number of data streams is provided from a data source 1706 to a transmit (TX) data processor 1708.

In one embodiment, each data stream is transmitted over a respective transmit antenna. TX data processor 1708 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 1710.

The modulation symbols for all data streams are then provided to a TX MIMO processor 1712, which may further process the modulation symbols (e.g., for OFDM). TX MIMO processor 1712 then provides $N_T$ modulation symbol streams to $N_T$ transmitters (TMTR) 1714a through 1714t. In certain embodiments, TX MIMO processor 1712 applies beamforming weights to the symbols of the data streams and to the antenna from which the symbol is being transmitted.

Each transmitter 1714 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1714a through 1714t are then transmitted from $N_T$ antennas 1716a through 1716t, respectively.

At receiver system 1704, the transmitted modulated signals are received by $N_R$ antennas 1718a through 1718r and the received signal from each antenna 1718 is provided to a respective receiver (RCVR) 1720a through 1720r. Each receiver 1720 conditions (e.g., filters, amplifies, and downconverts) a respective received signal, digitizes the conditioned signal to provide samples, and further processes the samples to provide a corresponding "received" symbol stream.

An RX data processor 1722 then receives and processes the $N_R$ received symbol streams from $N_R$ receivers 1720 based on a particular receiver processing technique to provide $N_T$ "detected" symbol streams. The RX data processor 1722 then demodulates, deinterleaves, and decodes each detected symbol stream to recover the traffic data for the data stream. The processing by RX data processor 1722 is complementary to that performed by TX MIMO processor 1712 and TX data processor 1708 at transmitter system 1702.

A processor 1724 periodically determines which precoding matrix to use. Processor 1724 formulates a reverse link message comprising a matrix index portion and a rank value portion.

The reverse link message may comprise various types of information regarding the communication link and/or the received data stream. The reverse link message is then processed by a TX data processor 1726, which also receives traffic data for a number of data streams from a data source 1728, modulated by a modulator 1730, conditioned by transmitters 1720a through 1720r, and transmitted back to transmitter system 1702.

At transmitter system 1702, the modulated signals from receiver system 1704 are received by antennas 1716, conditioned by receivers 1714, demodulated by a demodulator 1732, and processed by a RX data processor 1734 to extract the reverse link message transmitted by the receiver system 1704. Processor 1710 then determines which pre-coding matrix to use for determining the beamforming weights then processes the extracted message.

Memory 1736 can be used to temporarily store some buffered/computational data from 1732 or 1734 through processor 1710, store some buffered data from 1706, or store some specific program codes. Further, memory 1738 may be used to temporarily store some buffered/computational data from 1722 through processor 1724, store some buffered data from 1728, or store some specific program codes.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects, a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), Universal Mobile Telecommunications System (UMTS), Worldwide Interoperability for Microwave Access (WiMAX), enhanced General Packet Radio Service (enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method for a user equipment (UE), comprising:
   transmitting a first interest indication in a first serving cell by the UE, wherein the UE is in a first RRC_CONNECTED state;
   entering an RRC_INACTIVE state or an RRC_IDLE state from the first RRC_CONNECTED state;
   determining whether to transmit a second interest indication in a second serving cell upon entering a second RRC_CONNECTED state from the RRC_INACTIVE state based on comparison between content of the second interest indication and content of the first interest indication; and
   transmitting the second interest indication in the second serving cell upon entering the second RRC_CONNECTED state from the RRC_INACTIVE state if the content of the second interest indication is not the same as the content of the first interest indication and not transmitting the second interest indication in the second serving cell upon entering the second RRC_CONNECTED state from the RRC_INACTIVE state when the content of the second interest indication is the same as the content of the first interest indication.

2. The method of claim 1, wherein the UE retains information included in the first interest indication when the UE enters the RRC_INACTIVE state from the first RRC_CONNECTED state.

3. The method of claim 1, wherein at least one of the first interest indication or the second interest indication indicates one or more identities of at least one of a broadcast service or a multicast service the UE is interested in.

4. The method of claim 1, wherein the UE transmits the second interest indication regardless of whether a set of multicast frequencies of interest to be carried by the second interest indication is empty or not.

5. The method of claim 1, wherein the first serving cell and the second serving cell are the same cell.

6. The method of claim 1, wherein the first serving cell and the second serving cell belong to at least one of the same Radio Access Network (RAN) paging area or the same RAN notification area.

7. The method of claim 1, further comprising:
   entering a fourth RRC_CONNECTED state from the RRC_INACTIVE state and transmitting a fifth interest indication for at least one of broadcast or multicast in a third serving cell even if content of the fifth interest indication is the same as the content of the first interest indication, wherein the first serving cell and the third serving cell at least one of belong to different RAN paging areas, belong to different RAN notification areas, or use different Radio Access Technologies (RATs).

8. The method of claim 1, further comprising:
   entering a third RRC_CONNECTED state from the RRC_IDLE state and transmitting a third interest indication in the second serving cell even if content of the third interest indication is the same as the content of the first interest indication.

9. A communication device comprising:
   a control circuit;
   a processor installed in the control circuit; and
   a memory installed in the control circuit and operatively coupled to the processor;
   wherein the processor is configured to execute a program code stored in the memory to perform acts comprising:
     transmitting a first interest indication in a first serving cell by the communication device, wherein the communication device is in a first RRC_CONNECTED state;
     entering an RRC_INACTIVE state or an RRC_IDLE state from the first RRC_CONNECTED state;
     determining whether to transmit a second interest indication in a second serving cell upon entering a second RRC_CONNECTED state from the RRC_I-

NACTIVE state based on comparison between content of the second interest indication and content of the first interest indication; and transmitting the second interest indication in the second serving cell upon entering the second RRC_CONNECTED state from the RRC_INACTIVE state if the content of the second interest indication is not the same as the content of the first interest indication and not transmitting the second interest indication in the second serving cell upon entering the second RRC_CONNECTED state from the RRC_INACTIVE state if the content of the second interest indication is the same as the content of the first interest indication.

10. The communication device of claim 9, further comprising:
entering a third RRC_CONNECTED state from the RRC_IDLE state and transmitting a third interest indication in the second serving cell even if content of the third interest indication is the same as the content of the first interest indication.

11. The communication device of claim 9, wherein the first serving cell and the second serving cell belong to at least one of the same Radio Access Network (RAN) paging area or the same RAN notification area.

12. The communication device of claim 9, further comprising:
entering a fourth RRC_CONNECTED state from the RRC_INACTIVE state and transmitting a fifth interest indication for at least one of broadcast or multicast in a third serving cell even if content of the fifth interest indication is the same as the content of the first interest indication, wherein the first serving cell and the third serving cell at least one of belong to different RAN paging areas, belong to different RAN notification areas, or use different Radio Access Technologies (RATs).

13. A communication device comprising:
a control circuit;
a processor installed in the control circuit;
a memory installed in the control circuit and operatively coupled to the processor;
wherein the processor is configured to execute a program code stored in the memory to perform acts comprising:
transmitting a first interest indication in a first serving cell by the communication device, wherein the communication device is in a first RRC_CONNECTED state;
entering an RRC_INACTIVE state or an RRC_IDLE state from the first RRC_CONNECTED state;
transmitting a second interest indication in a second serving cell upon entering a second RRC_CONNECTED state from the RRC_INACTIVE state if content of the second interest indication is not the same as content of the first interest indication and not transmitting the second interest indication in the second serving cell upon entering the second RRC_CONNECTED state from the RRC_INACTIVE state if the content of the second interest indication is the same as the content of the first interest indication; and
transmitting a third interest indication in the second serving cell upon entering a third RRC_CONNECTED state from the RRC_IDLE state even if content of the third interest indication is the same as the content of the first interest indication.

14. The communication device of claim 13, wherein the communication device retains information included in the first interest indication when the communication device enters the RRC_INACTIVE state from the first RRC_CONNECTED state.

15. The communication device of claim 13, wherein at least one of the first interest indication or the second interest indication indicates one or more identities of at least one of a broadcast service or a multicast service the communication device is interested in.

16. The communication device of claim 13, wherein the communication device transmits the second interest indication regardless of whether a set of multicast frequencies of interest to be carried by the second interest indication is empty or not.

17. The communication device of claim 13, wherein the first serving cell and the second serving cell are the same cell.

18. The communication device of claim 13, wherein the first serving cell and the second serving cell belong to at least one of the same Radio Access Network (RAN) paging area or the same RAN notification area.

19. The communication device of claim 13, further comprising:
entering a fourth RRC_CONNECTED state from the RRC_INACTIVE state and transmitting a fifth interest indication for at least one of broadcast or multicast in a third serving cell even if content of the fifth interest indication is the same as the content of the first interest indication, wherein the first serving cell and the third serving cell at least one of belong to different RAN paging areas, belong to different RAN notification areas, or use different Radio Access Technologies (RATs).

* * * * *